US008204617B2

(12) United States Patent
Teferra et al.

(10) Patent No.: US 8,204,617 B2
(45) Date of Patent: Jun. 19, 2012

(54) METHODS AND APPARATUS FOR ENHANCED OPERATION OF SUBSTRATE CARRIER HANDLERS

(75) Inventors: Michael Teferra, San Francisco, CA (US); Amitabh Puri, San Jose, CA (US); Eric Englhardt, Palo Alto, CA (US)

(73) Assignee: Applied Materials, Inc., Santa Clara, CA (US)

(*) Notice: Subject to any disclaimer, the term of this patent is extended or adjusted under 35 U.S.C. 154(b) by 1170 days.

(21) Appl. No.: 11/838,337

(22) Filed: Aug. 14, 2007

(65) Prior Publication Data

US 2007/0276532 A1 Nov. 29, 2007

Related U.S. Application Data

(63) Continuation of application No. 11/342,213, filed on Jan. 27, 2006, now Pat. No. 7,720,557, which is a continuation-in-part of application No. 11/067,302, filed on Feb. 25, 2005, now abandoned, which is a continuation-in-part of application No. 10/981,131, filed on Nov. 4, 2004, now Pat. No. 7,218,983.

(60) Provisional application No. 60/548,584, filed on Feb. 28, 2004, provisional application No. 60/518,583, filed on Nov. 6, 2003, provisional application No. 60/648,838, filed on Jan. 28, 2005.

(51) Int. Cl.
*G06F 19/00* (2011.01)

(52) U.S. Cl. .......................... 700/112; 414/935; 414/940

(58) Field of Classification Search .................. 700/99, 700/100, 112, 113, 121, 213, 214; 414/222.01, 414/222.11, 222.13, 403, 404, 935, 937, 414/940; 438/464
See application file for complete search history.

(56) References Cited

U.S. PATENT DOCUMENTS

| | | | |
|---|---|---|---|
| 3,845,286 A | 10/1974 | Aronstein et al. | |
| 3,952,388 A | 4/1976 | Hasegawa et al. | |
| 4,027,246 A | 5/1977 | Caccoma et al. | |
| 4,049,123 A | 9/1977 | Fegley et al. | |
| 4,166,527 A | 9/1979 | Beezer | |
| 4,722,659 A | 2/1988 | Hoyt et al. | |
| 4,852,717 A | 8/1989 | Ross et al. | |
| 4,892,761 A | 1/1990 | Yamada | |

(Continued)

FOREIGN PATENT DOCUMENTS

DE 19715974 A1 10/1998

(Continued)

OTHER PUBLICATIONS

Partial European Search Report of European Patent Application No. 05004338.9 issued on Dec. 12, 2007.

(Continued)

*Primary Examiner* — Charles Kasenge
(74) *Attorney, Agent, or Firm* — Dugan & Dugan, PC

(57) ABSTRACT

Systems, tools, and methods are provided in which a first signal is transmitted from a tool to a Fab indicating that all substrates to be processed have been removed from a specific carrier and that the specific carrier may be temporarily unloaded from a loadport of the tool. A second signal is transmitted from the tool to the Fab indicating that the specific carrier may be returned to the tool. While the carrier is unloaded from the tool, other carriers may be loaded on the vacated loadport. Numerous other features and aspects of the invention are disclosed.

19 Claims, 18 Drawing Sheets

U.S. PATENT DOCUMENTS

| | | | |
|---|---|---|---|
| 4,936,734 A | 6/1990 | Osada | |
| 4,966,094 A | 10/1990 | Yamada | |
| 4,974,166 A | 11/1990 | Maney et al. | |
| 5,064,337 A | 11/1991 | Asakawa et al. | |
| 5,183,378 A | 2/1993 | Asano et al. | |
| 5,191,908 A | 3/1993 | Hiroe et al. | |
| 5,256,204 A | 10/1993 | Wu | |
| 5,269,643 A | 12/1993 | Kodama et al. | |
| 5,372,471 A | 12/1994 | Wu | |
| 5,382,127 A | 1/1995 | Garric et al. | |
| 5,388,945 A | 2/1995 | Garric et al. | |
| 5,390,785 A | 2/1995 | Garric et al. | |
| 5,411,358 A | 5/1995 | Garric et al. | |
| 5,544,350 A | 8/1996 | Hung et al. | |
| 5,562,383 A | 10/1996 | Iwai et al. | |
| 5,570,990 A | 11/1996 | Bonora et al. | |
| 5,612,886 A | 3/1997 | Weng | |
| 5,668,056 A | 9/1997 | Wu et al. | |
| 5,696,689 A | 12/1997 | Okumura et al. | |
| 5,751,581 A | 5/1998 | Tau et al. | |
| 5,811,211 A | 9/1998 | Tanaka et al. | |
| 5,818,716 A | 10/1998 | Chin et al. | |
| 5,825,650 A | 10/1998 | Wang | |
| 5,884,392 A | 3/1999 | Lafond | |
| 5,888,042 A | 3/1999 | Oda | |
| 5,957,648 A | 9/1999 | Bachrach | |
| 5,971,585 A | 10/1999 | Dangat et al. | |
| 5,976,199 A | 11/1999 | Wu et al. | |
| 5,980,183 A | 11/1999 | Fosnight | |
| 6,009,890 A | 1/2000 | Kaneko et al. | |
| 6,026,561 A | 2/2000 | Lafond | |
| 6,039,316 A | 3/2000 | Jackson et al. | |
| 6,048,259 A | 4/2000 | Asai | |
| 6,050,768 A | 4/2000 | Iwasaki et al. | |
| 6,053,688 A * | 4/2000 | Cheng | 414/937 |
| 6,053,983 A | 4/2000 | Saeki et al. | |
| 6,074,443 A | 6/2000 | Venkatesh et al. | |
| 6,082,948 A | 7/2000 | Fishkin et al. | |
| 6,128,588 A | 10/2000 | Chacon | |
| 6,134,482 A | 10/2000 | Iwasaki | |
| 6,144,926 A | 11/2000 | Ishizawa et al. | |
| 6,183,186 B1 | 2/2001 | Howells et al. | |
| 6,196,001 B1 | 3/2001 | Tannous et al. | |
| 6,240,335 B1 | 5/2001 | Wehrung et al. | |
| 6,256,550 B1 | 7/2001 | Wu et al. | |
| 6,303,398 B1 | 10/2001 | Goerigk | |
| 6,351,686 B1 | 2/2002 | Iwasaki et al. | |
| 6,411,859 B1 | 6/2002 | Conboy et al. | |
| 6,415,260 B1 | 7/2002 | Yang et al. | |
| 6,431,814 B1 | 8/2002 | Christensen et al. | |
| 6,439,822 B1 | 8/2002 | Kimura et al. | |
| 6,463,350 B2 | 10/2002 | Fukuda et al. | |
| 6,526,329 B2 | 2/2003 | Tateyama et al. | |
| 6,540,466 B2 * | 4/2003 | Bachrach | 414/940 |
| 6,540,467 B1 | 4/2003 | Zohni et al. | |
| 6,579,052 B1 | 6/2003 | Bonora et al. | |
| 6,580,967 B2 | 6/2003 | Jevtic et al. | |
| 6,587,744 B1 | 7/2003 | Stoddard et al. | |
| 6,599,670 B2 | 7/2003 | Ikuno et al. | |
| 6,612,797 B1 * | 9/2003 | Bonora et al. | 414/217 |
| 6,640,148 B1 | 10/2003 | Miller et al. | |
| 6,641,350 B2 | 11/2003 | Nakashima et al. | |
| 6,662,076 B1 | 12/2003 | Conboy et al. | |
| 6,673,638 B1 | 1/2004 | Bendik et al. | |
| 6,675,066 B2 | 1/2004 | Moshgbar | |
| 6,684,124 B2 | 1/2004 | Schedel et al. | |
| 6,702,099 B2 | 3/2004 | Otaguro et al. | |
| 6,715,602 B1 | 4/2004 | Gartland | |
| 6,715,978 B2 | 4/2004 | Lin et al. | |
| 6,745,093 B1 | 6/2004 | Kawano et al. | |
| 6,769,855 B2 | 8/2004 | Yokomori et al. | |
| 6,788,996 B2 | 9/2004 | Shimizu | |
| 6,823,229 B2 * | 11/2004 | Ootani et al. | 700/112 |
| 6,830,651 B2 | 12/2004 | Obikane | |
| 6,839,603 B2 | 1/2005 | Karasawa | |
| 6,853,876 B2 | 2/2005 | Wehrung et al. | |
| 6,854,583 B1 | 2/2005 | Horn | |
| 6,863,485 B2 | 3/2005 | Mizokawa et al. | |
| 6,873,963 B1 | 3/2005 | Westbury et al. | |
| 6,917,844 B2 | 7/2005 | Kawano et al. | |
| 6,943,047 B2 | 9/2005 | Yanagisawa et al. | |
| 6,971,500 B2 | 12/2005 | Horn | |
| 7,039,495 B1 | 5/2006 | Conboy et al. | |
| 7,051,870 B2 | 5/2006 | Schoendienst et al. | |
| 7,072,730 B2 | 7/2006 | Kobayashi et al. | |
| 7,077,264 B2 | 7/2006 | Rice et al. | |
| 7,137,874 B1 | 11/2006 | Bovio et al. | |
| 7,156,221 B2 | 1/2007 | Rice et al. | |
| 7,177,716 B2 | 2/2007 | Duffin | |
| 7,218,983 B2 | 5/2007 | Puri et al. | |
| 7,234,584 B2 | 6/2007 | Rice et al. | |
| 7,243,003 B2 | 7/2007 | Rice et al. | |
| 7,274,971 B2 | 9/2007 | Brill | |
| 7,283,890 B2 | 10/2007 | Iijima et al. | |
| 7,413,069 B2 | 8/2008 | Brill | |
| 2001/0038783 A1 | 11/2001 | Nakashima et al. | |
| 2001/0051837 A1 | 12/2001 | Tateyama et al. | |
| 2002/0071744 A1 | 6/2002 | Bachrach | |
| 2002/0081181 A1 | 6/2002 | Yokomori et al. | |
| 2002/0094588 A1 | 7/2002 | Fan et al. | |
| 2002/0114684 A1 | 8/2002 | Jeong et al. | |
| 2002/0116086 A1 | 8/2002 | Huber et al. | |
| 2002/0144654 A1 | 10/2002 | Elger | |
| 2002/0150447 A1 | 10/2002 | Mizokawa et al. | |
| 2002/0150448 A1 | 10/2002 | Mizokawa et al. | |
| 2002/0155705 A1 | 10/2002 | Shimizu | |
| 2002/0182040 A1 | 12/2002 | Kimura et al. | |
| 2002/0192055 A1 | 12/2002 | Kobayachi et al. | |
| 2002/0198623 A1 | 12/2002 | Jevtic et al. | |
| 2003/0108407 A1 | 6/2003 | Ogata et al. | |
| 2003/0113190 A1 | 6/2003 | Bachrach | |
| 2003/0202866 A1 | 10/2003 | Weng et al. | |
| 2004/0049398 A1 | 3/2004 | Gartland et al. | |
| 2004/0062633 A1 | 4/2004 | Rice et al. | |
| 2004/0081538 A1 | 4/2004 | Rice et al. | |
| 2004/0187342 A1 | 9/2004 | Izuta | |
| 2004/0193300 A1 | 9/2004 | Rice et al. | |
| 2004/0225393 A1 | 11/2004 | Kawano et al. | |
| 2004/0249494 A1 | 12/2004 | Kobayashi et al. | |
| 2004/0262132 A1 | 12/2004 | Pauley et al. | |
| 2005/0036856 A1 | 2/2005 | Yamashita | |
| 2005/0071043 A1 | 3/2005 | Jevtic et al. | |
| 2005/0096775 A1 | 5/2005 | Wang et al. | |
| 2005/0096782 A1 | 5/2005 | Chen et al. | |
| 2005/0209721 A1 | 9/2005 | Teferra et al. | |
| 2005/0232734 A1 | 10/2005 | Elliott et al. | |
| 2005/0273191 A1 | 12/2005 | Englhardt et al. | |
| 2006/0190118 A1 | 8/2006 | Teferra et al. | |
| 2007/0059861 A1 | 3/2007 | Rice et al. | |
| 2007/0061034 A1 | 3/2007 | Puri et al. | |
| 2007/0276531 A1 | 11/2007 | Teferra et al. | |
| 2007/0276532 A1 | 11/2007 | Teferra et al. | |
| 2008/0219816 A1 | 9/2008 | Rice et al. | |

FOREIGN PATENT DOCUMENTS

| | | | |
|---|---|---|---|
| EP | 0 365 589 B1 | 9/1992 | |
| EP | 0 663 686 A1 | 7/1995 | |
| EP | 0 850 720 A1 | 7/1998 | |
| EP | 1128246 A2 | 8/2001 | |
| EP | 1164437 A2 | 12/2001 | |
| JP | 55091839 A | 7/1980 | |
| JP | 58028860 A | 2/1983 | |
| JP | 60049623 A | 3/1985 | |
| JP | 63234511 | 9/1988 | |
| JP | 01181156 A | 7/1989 | |
| JP | 01257549 A | 10/1989 | |
| JP | 02015647 A | 1/1990 | |
| JP | 05128131 A | 5/1993 | |
| JP | 05290053 A | 11/1993 | |
| JP | 06132696 | 5/1994 | |
| JP | 06260545 A | 9/1994 | |
| JP | 08249044 A | 9/1996 | |
| JP | 09115817 A | 5/1997 | |
| JP | 10135096 A | 5/1998 | |
| JP | 11176717 A | 7/1999 | |
| JP | 11296208 A | 10/1999 | |
| JP | 2000012646 A2 | 1/2000 | |

| | | |
|---|---|---|
| JP | 2001332464 A | 11/2001 |
| JP | 2003007584 A | 1/2003 |
| KR | 10-2001000330 | 1/2001 |
| KR | 10-2002001902 | 3/2002 |
| KR | 10-2003002985 | 4/2003 |
| TW | 0452564 | 9/2001 |
| TW | 455973 | 9/2001 |
| TW | 0553877 | 9/2003 |
| TW | 0565519 | 12/2003 |
| WO | WO 99/28952 A2 | 6/1999 |
| WO | WO 03/057806 A1 | 7/2003 |
| WO | WO 03/058706 | 7/2003 |
| WO | WO 2005/006408 A1 | 1/2005 |
| WO | WO 2006/081519 A2 | 8/2006 |

OTHER PUBLICATIONS

Office Action of U.S. Appl. No. 11/342,213 mailed on Feb. 20, 2008.
Office Action of U.S. Appl. No. 11/342,213 mailed on Aug. 20, 2008.
Advisory Action of U.S. Appl. No. 11/342,213 mailed Dec. 29, 2009.
Jan. 15, 2010 Response to Final Office Action of U.S. Appl. No. 11/342,213 mailed Aug. 17, 2009.
Notice of Allowance of U.S. Appl. No. 11/067,302 mailed Jan. 8, 2010.
Notice of Allowance of U.S. Appl. No. 11/342,213 mailed Feb. 4, 2010.
International Search Report of International Application No. PCT/US2006/003130 mailed Oct. 24, 2006.
Written Opinion of International Application No. PCT/US2006/003130 mailed Oct. 24, 2006.
Office Action and Search Report of Taiwan Application No. 094106144 issued Dec. 8, 2008.
Przewlocki, H. et al., "DIASTEMOS—computerized system of IC manufacturing control and diagnostics", 1990, Elektronika, vol. 31 No. 11-12, pp. 38-40, Polish Language. (Abstract only).
Lovell, A. M. et al., "Cell automation: integrating manufacturing with robotics", Dec. 1990, Solid State Technology, vol. 33 No. 12, p. 37-9.
Prasad, K., "A generic computer simulation model to characterize photolithography manufacturing area in an IC FAB facility", Sep. 1991, IEEE Transactions on Components, Hybrids, and Manufacturing Technology, vol. 14 No. 3, p. 483-7.
Ehteshami, B. et al., "Trade-offs in cycle time management: hot lots", May 1992, IEEE Transactions on Semiconductor Manufacturing, vol. 5 No. 2, p. 101-6.
Lou, S. et al., "Using simulation to test the robustness of various existing production control policies", 1991 Winter Simulation Conference Proceedings, IEEE, p. 261-9.
Berg, R. et al., "The formula: world class manufacturing for hybrid thin-film component production", 1992, IEEE/SEMI International Semiconductor Manufacturing Science Symposium, pp. 53-60.
Naguib, H., "The implementation of total quality management in a semiconductor manufacturing operation", 1992, IEEE/SEMI International Semiconductor Manufacturing Science Symposium, p. 63-7.
Rose, D., "Productivity enhancement", 1992, IEEE/SEMI International Semiconductor Manufacturing Science Symposium, p. 68.
Narayanan, S. et al., "Object-oriented simulation to support operator decision making in semiconductor manufacturing", 1992 IEEE International Conference on Systems, Man and Cybernetics, vol. 2, p. 1510-15.
Leonovich, G. A. et al., "Integrated cost and productivity learning in CMOS semiconductor manufacturing", Jan.-Mar. 1995, IBM Journal of Research and Development, vol. 39 No. 1-2, p. 201-13.
Leonovich, G., "An approach for optimizing WIP/cycle time/output in a semiconductor fabricator", 1994, Sixteenth IEEE/CPMT International Electronics Manufacturing Technology Symposium. 'Low-Cost Manufacturing Technologies for Tomorrow's Global Economy'. Proceedings 1994 IEMT Symposium, vol. 1, p. 108-11.
Schomig, A. K. et al., "Performance modelling of pull manufacturing systems with batch servers", 1995, Proceedings 1995 INRIA/IEEE Symposium on Emerging Technologies and Factory Automation. ETFA'95, vol. 3, p. 175-83.
Juba, R. C. et al., "Production improvements using a forward scheduler", 1996, Seventeenth IEEE/CPMT International Electronics Manufacturing Technology Symposium 'Manufacturing Technologies—Present and Future', p. 205-9.
Fuller, L. F. et al., "Improving manufacturing performance at the Rochester Institute of Technology integrated circuit factory", 1995, IEEE/SEMI 1995 Advanced Semiconductor Manufacturing Conference and Workshop. Theme—Semiconductor Manufacturing: Economic Solutions for the 21st Century. ASMC '95 Proceedings, p. 350-5.
Houmin, Yan et al., "Testing the robustness of two-boundary control policies in semiconductor manufacturing", May 1996, IEEE Transactions on Semiconductor Manufacturing, vol. 9 No. 2, p. 285-8.
Lopez, M. J. et al., "Performance models of systems of multiple cluster tools", 1996, Nineteenth IEEE/CPMT International Electronics Manufacturing Technology Symposium. Proceedings 1996 IEMT Symposium, pp. 57-65.
Collins, D. W. et al., "Implementation of Minimum Inventory Variability Scheduling 1-Step Ahead Policy(R) in a large semiconductor manufacturing facility", 1997 IEEE 6th International Conference on Emerging Technologies and Factory Automation Proceedings, pp. 497-504.
Labanowski, L., "Improving overall fabricator performance using the continuous improvement methodology", 1997 IEEE/SEMI Advanced Semiconductor Manufacturing Conference and Workshop. Theme—The Quest for Semiconductor Manufacturing Excellence: Leading the Charge into the 21st Century. ASMC Proceedings, p. 405-9.
Dudde, R. et al., "Flexible data registration and automation in semiconductor production", 1997, Proceedings of the SPIE—The International Society for Optical Engineering, p. 171-81.
Padillo, J. M. et al., "A strategic domain: IE in the semiconductor industry", Mar. 1998, IIE Solutions, pp. 36-40, 42.
Collins, D. W. et al., "Investigation of minimum inventory variability scheduling policies in a large semiconductor manufacturing facility", 1997, Proceedings of the 1997 American Control Conference, vol. 3, p. 1924-8.
Rose, O., "WIP evolution of a semiconductor factory after a bottleneck workcenter breakdown", 1998 Winter Simulation Conference. Proceedings, vol. 2, pp. 997-1003.
Iriuchijima, K. et al., "WIP allocation planning for semiconductor factories", 1998, Proceedings of the 37th IEEE Conference on Decision and Control, vol. 3, p. 2716-21.
Weiss, M., "New twists on 300 mm fab design and layout", Jul. 1999, Semiconductor International, vol. 22 No. 8, pp. 103-104, 106, 108.
Van Antwerp, K. et al., "Improving work-in-progress visibility with active product tags ÝASIC manufacture", Oct. 1999, Micro, vol. 17 No. 9, pp. 67-69, 72-73.
Martin, D. P., "Total operational efficiency (TOE): the determination of two capacity and cycle time components and their relationship to productivity improvements in a semiconductor manufacturing line", 1999, 10th Annual IEEE/SEMI. Advanced Semiconductor Manufacturing Conference and Workshop. ASMC 99 Proceedings, pp. 37-41.
Martin, D. P., "Capacity and cycle time-throughput understanding system (CAC-TUS) an analysis tool to determine the components of capacity and cycle time in a semiconductor manufacturing line", 1999, 10th Annual IEEE/SEMI. Advanced Semiconductor Manufacturing Conference and Workshop. ASMC 99 Proceedings, p. 127-31.
Marcoux, P. et al., "Determining capacity loss from operational and technical deployment practices in a semiconductor manufacturing line", 1999 IEEE International Symposium on Semiconductor Manufacturing Conference Proceedings, p. 3-5.
Chen, J. C. et al., "Capacity planning for a twin fab", 1999 IEEE International Symposium on Semiconductor Manufacturing Conference Proceedings, p. 317-20.
Hughlett, E., "Incremental levels of automation in the compound semiconductor fab", Aug. 2001, Compound Semiconductor, vol. 7 No. 7, p. 69-73.
Sarin, S. C. et al., "Reduction of average cycle time at a wafer fabrication facility", 2001 GaAs MANTECH Conference. Digest of Papers, p. 241-6.
Saito, K. et al., "A simulation study on periodical priority dispatching of WIP for product-mix fabrication", 2002, 13th Annual IEEE/SEMI Advanced Semiconductor Manufacturing Conference. Advancing the Science and Technology of Semiconductor Manufacturing. ASMC 2002, p. 33-7.

Wang, J. et al., "The improvement of automated material handling system traffic control", 2002 Semiconductor Manufacturing Technology Workshop, p. 271-4.

Wei Jie Lee, "Optimize WIP scale through simulation approach with WIP, turn-over rate and cycle time regression analysis in semiconductor fabrication", 2002 Semiconductor Manufacturing Technology Workshop, p. 299-301.

Young Hoon Lee et al., "Push-pull production planning of the re-entrant process", 2003, International Journal of Advanced Manufacturing Technology, vol. 22 No. 11-12, p. 922-31.

Garlid, Scott C., "From philosophy to reality. Interpreting the rules of JIT for IC manufacturing", 1989, SME Technical Paper (Series) MS. Publ by SME, p. 797.

Anon, "Wafer level automation", Jan. 1995, European Semiconductor, vol. 17 No. 1, p. 2.

Anon, "Coming of fab-wide automation", May 1998, European Semiconductor Design Production Assembly, vol. 20 No. 5, p. 21-22.

Pierce, Neal G. et al., "Dynamic dispatch and graphical monitoring system", 1999, IEEE International Symposium on Semiconductor Manufacturing Conference, Proceedings 1999, p. 65-68.

Nagesh, Sukhi et al., "Intelligent second-generation MES solutions for 300mm fabs", 2000, Solid State Technology, vol. 43 No. 6, pp. 133-134, 136, 138.

"300mm single-wafer transport", Jul. 1999, Solid State Technology—semiconductor manufacturing and wafer fabrication, Semicon West '99 Product Spotlight, p. 5.

"300mm single-wafer handling", Apr. 2000, Solild State Technology, Product News, <www.sold-state.com>, p. 99.

Griessing, Juergen et al., "Assessing the feasibility of a 300-mm test and monitor wafer handeling and logistics system", Jul. 2000, Micro: The 300-mm Imperative, pp. 1-19.

"The Leading Company in Micro environment", Jan. 3, 2002, Incam Solutions Company, pp. 1-2.

"Improved wafer isolation and additional flexibility", Jan. 3, 2002, Incam Solutions Company SWIF technology, pp. 1-2.

"SEMI standards compliance" and "Related SEMI standards", Jan. 3, 2002, Incam Solutions Related standards, p. 1.

"Single Wafer Lots Solution", Jan. 3, 2002, Incam Solutions References, p. 1.

Wei Jun-Hu et al., "Optimization methodology in simulation-based scheduling for semiconductor manufacturing", Oct. 2000, Information and Control, vol. 29 No. 5, p. 425-30, Chinese language. (Abstract only).

Notice of Abandonment of U.S. Appl. No. 11/067,302 mailed Apr. 23, 2010.

Terminal Disclaimer of U.S. Appl. No. 11/838,322 filed in U.S. Appl. No. 11/067,302 on Jul. 22, 2008.

Interview Summary of U.S. Appl. No. 11/555,271, filed Jan. 18, 2008.

Terminal Disclaimer of Patent No. 7,218,983 filed in U.S. Appl. No. 11/555,271 on Feb. 9, 2009.

International Preliminary Report on Patentability of International Application No. PCT/US2006/003130 mailed Aug. 9, 2007.

Office Action of U.S. Appl. No. 10/981,131 mailed Jul. 28, 2005.

Oct. 28, 2005 Response to Office Action of U.S. Appl. No. 10/981,131 mailed Jul. 28, 2005.

Office Action of U.S. Appl. No. 10/981,131 mailed Jan. 24, 2006.

Jun. 26, 2006 Response to Office Action of U.S. Appl. No. 10/981,131 mailed Jan. 24, 2006.

Notice of Allowance of U.S. Appl. No. 10/981,131 mailed Jul. 12, 2006.

Notice of Allowance of U.S. Appl. No. 10/981,131 mailed Dec. 13, 2006.

Office Action of U.S. Appl. No. 11/067,302 mailed Dec. 11, 2006.

Apr. 11, 2007 Response to Office Action of U.S. Appl. No. 11/067,302 mailed Dec. 11, 2006.

Office Action of U.S. Appl. No. 11/067,302 mailed Jun. 29, 2007.

Oct. 1, 2007 Response to Office Action of U.S. Appl. No. 11/067,302 mailed Jun. 29, 2007.

Notice of Allowance of U.S. Appl. No. 11/067,302 mailed Nov. 14, 2007.

Office Action of U.S. Appl. No. 11/067,302 mailed Apr. 21, 2008.

Jul. 22, 2008 Response to Office Action of U.S. Appl. No. 11/067,302 mailed Apr. 21, 2008.

Notice of Non-Compliant Amendment of U.S. Appl. No. 11/067,302 mailed Aug. 29, 2008.

Sep. 29, 2008 Response to Notice of Non-Compliant Amendment of U.S. Appl. No. 11/067,302 mailed Aug. 29, 2008.

Final Office Action of U.S. Appl. No. 11/067,302 mailed Jan. 21, 2009.

Apr. 3, 2009 Response to Final Office Action of U.S. Appl. No. 11/067,302 mailed Jan. 21, 2009.

Notice of Allowance of U.S. Appl. No. 11/067,302 mailed Apr. 7, 2009.

Notice of Allowance of U.S. Appl. No. 11/067,302 mailed Aug. 12, 2009.

Office Action of U.S. Appl. No. 11/342,213 mailed Apr. 5, 2007.

Jul. 5, 2007 Response to Office Action of U.S. Appl. No. 11/342,213 mailed Apr. 5, 2007.

Final Office Action of U.S. Appl. No. 11/342,213 mailed Sep. 28, 2007.

Dec. 28, 2007 Response to Final Office Action of U.S. Appl. No. 11/342,213 mailed Sep. 28, 2007.

Office Action of U.S. Appl. No. 11/342,213 mailed Feb. 20, 2008.

May 20, 2008 Response to Office Action of U.S. Appl. No. 11/342,213 mailed Feb. 20, 2008.

Office Action of U.S. Appl. No. 11/342,213 mailed Aug. 20, 2008.

Nov. 20, 2008 Response to Office Action of U.S. Appl. No. 11/342,213 mailed Aug. 20, 2008.

Office Action of U.S. Appl. No. 11/342,213 mailed Feb. 3, 2009.

May 22, 2009 Response to Office Action of U.S. Appl. No. 11/342,213 mailed Feb. 3, 2009.

Final Office Action of U.S. Appl. No. 11/342,213 mailed Aug. 17, 2009.

Office Action of U.S. Appl. No. 11/555,271 mailed Apr. 3, 2007.

Jul. 3, 2007 Response to Office Action of U.S. Appl. No. 11/555,271 mailed Apr. 3, 2007.

Final Office Action of U.S. Appl. No. 11/555,271 mailed Sep. 21, 2007.

Jan. 18, 2008 Response to Final Office Action of U.S. Appl. No. 11/555,271 mailed Sep. 21, 2007.

Advisory Action of U.S. Appl. No. 11/555,271 mailed Mar. 17, 2008.

Office Action of U.S. Appl. No. 11/555,271 mailed Apr. 22, 2008.

Sep. 22, 2008 Response to Office Action of U.S. Appl. No. 11/555,271 mailed Apr. 22, 2008.

Final Office Action of U.S. Appl. No. 11/555,271 mailed Dec. 10, 2008.

Feb. 9, 2009 Response to Final Office Action of U.S. Appl. No. 11/555,271 mailed Dec. 10, 2008.

Notice of Allowance of U.S. Appl. No. 11/555,271 mailed Mar. 19, 2009.

Notice of Allowance of U.S. Appl. No. 11/555,271 mailed Aug. 20, 2009.

Office Action of U.S. Appl. No. 11/838,322 mailed Apr. 23, 2008.

Sep. 22, 2008 Response to Office Action of U.S. Appl. No. 11/838,322 mailed Apr. 23, 2008.

Final Office Action of U.S. Appl. No. 11/838,322 mailed Dec. 11, 2008.

Notice of Abandonment of U.S. Appl. No. 11/838,322 mailed Jun. 18, 2009.

Search Report of Taiwan Application No. 95103794 dated Jul. 12, 2010.

Nov. 17, 2009 Response to Final Office Action of U.S. Appl. No. 11/342,213 mailed Aug. 17, 2009.

Search Report of Taiwan Patent Application No. 93133844 dated Feb. 16, 2011.

Supplemental Notice of Allowance of U.S. Appl. No. 11/067,302 mailed Apr. 5, 2010.

\* cited by examiner

Table 7 Extension of Carrier
State Transition Definition of E87

| # | Previous State | Trigger | New State | Actions | Comments |
|---|---|---|---|---|---|
| 22 | ID VERIFICATION OK | Carrier that was in IN ACCESS NEEDS UNLOADING state is unloaded | ID NOT READ | None. | Data required to be available for this event report:<br>CarrierID<br>CarrierIDStatus |
| 23 | SLOT MAP VERIFICATION OK | Carrier that was in IN ACCESS NEEDS UNLOADING state is unloaded | SLOT MAP NOT READ | None. | Data required to be available for this event report:<br>CarrierID<br>CarrierSlotMapStatus<br>The tool expects the slot map for this carrier to be the same (when reloaded on the tool) as when it was unloaded. |

FIG. 15A

| | | | |
|---|---|---|---|
| 24 | IN ACCESS | Tool has determined that the IN ACCESS carrier is not needed for some time and needs to be unloaded. The trigger for this transistion should be generated only after the carrier door has been closed. | IN ACCESS NEEDS UNLOADING | Tool saves current slot map state and will use it for verification when the carrier is reloaded later. Tool shall not unload or load wafers into the carrier once in this state. | Data required to be available for this event report: CarrierID CarrierAccessingStatus SlotMap Once this state is reached, the tool will also transition the load port associated with the carrier to the READY TO UNLOAD state. |
| 25 | IN ACCESS NEEDS UNLOADING | The carrier is unloaded from the equipment. | IN ACCESS UNLOADED | None. | Data required to be available for this event report: CarrierID CarrierAccessingStatus At some point in the future, the tool will request that this carrier be reloaded on a specific load port (equivalent to a tool initiated Bind Service) |

*FIG. 15B*

| | | | | |
|---|---|---|---|---|
| 26 | IN ACCESS UNLOADED | The carrier is loaded and its ID verified. | IN ACCESS RELOADED | None. | Data required to be available for this event report: CarrierID CarrierAccessingStatus |
| 27 | IN ACCESS RELOADED | Slot map for the carrier is verified OK. | IN ACCESS | None | Data required to be available for this event report: CarrierID CarrierAccessingStatus The slot map for the carrier is verified by the equipment to be the same as when the carrier was unloaded. |
| 28 | IN ACCESS RELOADED | Slot map verification for the carrier fails. | CARRIER STOPPED | None | Data required to be available for this event report: CarrierID CarrierAccessingStatus |

FIG. 15C

| | | | | |
|---|---|---|---|---|
| 29 | NOT ACCESSED | Tool determines that the carrier loaded on the load port is different than the one it had requested. | CARRIER STOPPED | None | Data required to be available for this event report: CarrierID CarrierAccessingStatus<br><br>The tool will request this carrier be unloaded, and after the carrier is unloaded, will re-request the loading of the carrier it desires. |
| 30 | IN ACCESS UNLOADED | Abnormal by service: DeleteCarrier service is received prior to Association of this carrier with a loadport and requesting a load | | The equipment destroys the instance of this carrier object | Data required to be available for this event report: CarrierID |

FIG. 15D

METHODS AND APPARATUS FOR ENHANCED OPERATION OF SUBSTRATE CARRIER HANDLERS

The present application is a continuation of and claims priority from U.S. patent application Ser. No. 11/342,213, filed Jan. 27, 2006 now U.S. Pat. No. 7,720,557 which is a continuation-in-part of and claims priority from U.S. patent application Ser. No. 11/067,302, filed Feb. 25, 2005 now abandoned which claims priority from U.S. Provisional Patent Application Ser. No. 60/548,584, filed Feb. 28, 2004 and which is a continuation-in-part of and claims priority from U.S. patent application Ser. No. 10/981,131, filed Nov. 4, 2004 now U.S. Pat. No. 7,218,983 which claims priority from U.S. Provisional Patent Application Ser. No. 60/518,583 filed Nov. 6, 2003. The present application also claims priority from U.S. Provisional Patent Application Ser. No. 60/648, 838, filed Jan. 28, 2005. The content of each of the above-identified patent applications is hereby incorporated by reference herein in its entirety for all purposes.

CROSS REFERENCE TO RELATED APPLICATIONS

The present application is related to the following commonly-assigned, co-pending U.S. Patent Applications, each of which is hereby incorporated by reference herein in its entirety:

U.S. patent application Ser. No. 11/067,311, filed Feb. 25, 2005 and titled "METHODS AND APPARATUS FOR MATERIAL CONTROL SYSTEM INTERFACE";

U.S. patent application Ser. No. 11/067,460, filed Feb. 25, 2005 and titled "METHODS AND APPARATUS FOR TRANSFERRING A SUBSTRATE CARRIER WITHIN AN ELECTRONIC DEVICE MANUFACTURING FACILITY";

U.S. patent application Ser. No. 11/067,303, filed Feb. 25, 2005 and titled "METHODS AND APPARATUS FOR ELECTRONIC DEVICE MANUFACTURING SYSTEM MONITORING AND CONTROL";

U.S. patent application Ser. No. 10/650,310, filed Aug. 28, 2003 and titled "SYSTEM FOR TRANSPORTING SUBSTRATE CARRIERS";

U.S. patent application Ser. No. 10/764,982, filed Jan. 26, 2004 and titled "METHODS AND APPARATUS FOR TRANSPORTING SUBSTRATE CARRIERS";

U.S. patent application Ser. No. 10/650,480, filed Aug. 28, 2003 and titled "SUBSTRATE CARRIER HANDLER THAT UNLOADS SUBSTRATE CARRIERS DIRECTLY FROM A MOVING CONVEYOR"; and U.S. patent application Ser. No. 10/987,955, filed Nov. 12, 2004 and titled "BREAK-AWAY POSITIONING CONVEYOR MOUNT FOR ACCOMMODATING CONVEYOR BELT BENDS".

FIELD OF THE INVENTION

The present invention relates generally to electronic device fabrication systems, and is more particularly concerned with transferring substrate carriers between transport systems and processing tools within a fabrication facility.

BACKGROUND OF THE INVENTION

Manufacturing of electronic devices typically involves performing a sequence of procedures with respect to a substrate such as a silicon substrate, a glass plate, semiconductor substrate, etc. (Such substrates may also be referred to as wafers, whether patterned or unpatterned.) These steps may include polishing, deposition, etching, printing, photolithography, heat treatment, and so forth. Usually a number of different processing steps may be performed in a single processing system or "tool" which includes a plurality of processing chambers. However, it is generally the case that other processes are required to be performed at other processing locations within a fabrication facility, and it is accordingly necessary that substrates be transported within the fabrication facility from one processing location to another. Depending upon the type of electronic device to be manufactured, there may be a relatively large number of processing steps required to be performed at many different processing locations within the fabrication facility.

It is conventional to transport substrates from one processing location to another within substrate carriers such as sealed pods, cassettes, containers and so forth. It is also conventional to employ automated substrate carrier transport devices, such as automatic guided vehicles, overhead transport systems, substrate carrier handling robots, etc., to move substrate carriers from location to location within the fabrication facility or to transfer substrate carriers from or to a substrate carrier transport device.

For an individual substrate, the total fabrication process, from formation or receipt of the virgin substrate to cutting of semiconductor or other devices from the finished substrate, may require an elapsed time that is measured in weeks or months. In a typical fabrication facility, a large number of substrates may accordingly be present at any given time as "work in progress" (WIP). The substrates present in the fabrication facility as WIP may represent a very large investment of working capital, which tends to increase the per substrate manufacturing cost. It may therefore be desirable to reduce the amount of WIP for a given substrate throughput for the fabrication facility. To do so, the total elapsed time for processing each substrate should be reduced.

SUMMARY OF THE INVENTION

In a first aspect of the invention, a method is provided in which a first signal indicative of a status of contents of a carrier at a port associated with a tool is received. The status indicates whether (a) the carrier contains one or more substrates to be processed by the tool, or (b) the carrier is empty or contains only one or more substrates that have already been processed by the tool. A second signal indicative that the carrier is ready to be removed from the port is received and a transfer of the carrier based upon the first and second signals is performed.

In a second aspect of the invention, a method is provided in which a first signal is transmitted from a tool indicating that all substrates to be processed have been removed from a specific carrier and that the specific carrier may be temporarily unloaded from a loadport of the tool. A second signal is transmitted from the tool indicating that the specific carrier may be returned to the tool.

In a third aspect of the invention, a method is provided in which a tool requests a Fab to temporarily unload an in-access carrier from a loadport associated with a tool. The tool also requests the FAB to load the in-access carrier to a load port associated with the tool.

In a forth aspect of the invention, a system is provided in which a factory including at least one tool adapted to receive small lot carriers at a port associated with the tool. The tool is further adapted to transmit a first signal indicative of a status of contents of a carrier at the port. The status indicates whether (1) the carrier contains one or more substrates to be processed by the tool, or (2) the carrier is empty or contains only one or more substrates that have already been processed by the tool. The tool may transmit a second signal indicative that the carrier is ready to be removed from the port. The factory is adapted to receive the first and second signals and, in response, perform a transfer of the carrier based upon the first and second signals.

In a fifth aspect of the invention, a tool is provided which includes a loadport associated with a tool and a communications port adapted to communicate with a Fab that includes an automated material handling system adapted to load and unload carriers from the loadport and adapted to receive signals from the tool. The tool is adapted to transmit a first signal indicating that all substrates to be processed have been removed from a specific carrier and that the specific carrier may be temporarily unloaded from the loadport, and transmit a second signal indicating that the specific carrier may be returned to the tool.

In a sixth aspect of the invention, a tool is provided which includes a plurality of loadports associated with a tool; and a controller operative to communicate with a Fab, wherein the controller is adapted to request the Fab to temporarily unload a first in-access carrier from a loadport associated with the tool; and request the Fab to load the first in-access carrier to a loadport associated with the tool.

Other features and aspects of the present invention will become more fully apparent from the following detailed description of exemplary embodiments, the appended claims and the accompanying drawings.

BRIEF DESCRIPTION OF THE DRAWINGS

FIGS. 15A-D illustrate an example extension of the Carrier State Transition definitions of conventional SEMI E87.

DETAILED DESCRIPTION

Figure 1:
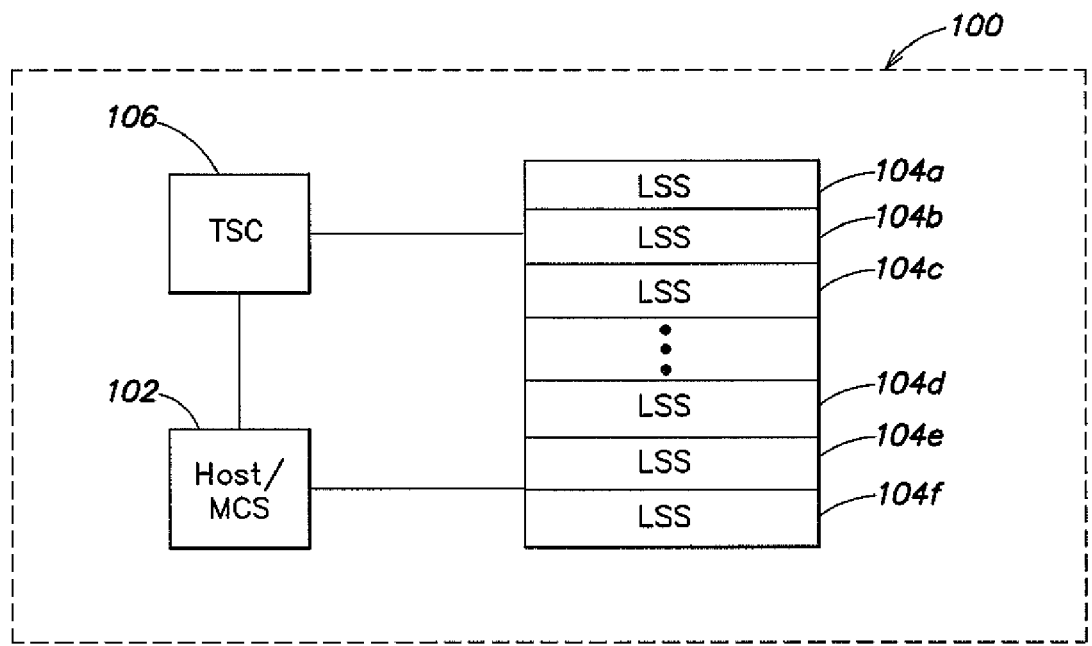
FIG. 1 is a block diagram depicting an example of a control system for an electronic device manufacturing facility according to some embodiments of the present invention.

The present invention provides systems and methods for substantially improving the efficiency of tool utilization in electronic device manufacturing or fabrication facilities (Fabs). Conventional Fabs are typically operated pursuant to a set of standardized rules or protocols (e.g., SEMI E87) that were originally developed for use with substrate carriers that held twenty-five or more substrates. However, the use of smaller lot sizes can provide significant efficiency advantages. Unfortunately, the conventional operating rules prevent the realization of the full benefits of the efficiency advantages of using smaller lot sizes and, in some cases, may actually degrade efficiency when smaller lot sizes are employed.

The present invention provides systems and methods that overcome the drawbacks of the conventional operating rules. The present invention provides modifications and/or extensions to the conventional operating rules to allow higher throughput to be realized using existing tools and smaller sized lots. These modifications to the conventional operating rules may generally be characterized as adding two new behaviors or capabilities to the existing behaviors or capabilities of tools/factories. The first extension to the operating rules allows a tool to request that the Fab temporarily unload an in-access carrier from the tool's loadport. Temporarily unloading is an indication to the Fab that the specified substrate carrier will need to be reloaded in the near future. The second extension to the operating rules allows a tool to request that the Fab load a specific carrier to a loadport. This permits the carrier that was previously unloaded using the first capability to be returned to the tool at an appropriate (e.g., efficient) time. Together, these extended capabilities allow the Fab to free-up tools' loadports, prevent the tools from having to wait for substrates to process (e.g., avoid tool starvation), and thus, improve efficiency by allowing the tool to realize maximum throughput. The present invention provides the interfaces and capabilities necessary for operating tools at peak throughputs even as lot sizes in carriers are reduced below the tool capacity.

Embodiments of the present invention provide methods and apparatus for operating tools, loadports, and substrate carrier handlers under the control of, for example, a material control system (MCS). The features of the present invention are particularly advantageous with the use of single or small lot size substrate carriers. As used herein, the term "small lot size" substrate carrier or "small lot" carrier may refer to a carrier that is adapted to hold fewer substrates than a conventional "large lot size" carrier which typically holds thirteen or twenty-five substrates. As an example, a small lot size carrier may be adapted to hold five or less substrates. In some embodiments, other small lot size carriers may be employed (e.g., small lot size carriers that hold one, two, three, four or more than five substrates, but less than that of a large lot size carrier). In general, each small lot size carrier may hold too few substrates for human transport of carriers to be viable within an electronic device or other manufacturing facility.

Typically, tools (e.g., process tools, metrology tools, etc.) in Fabs are designed to handle material (e.g., substrates) delivered to them by the host or factory in large lots (e.g., a lot size of 25 substrates). The large lots are delivered by the factory (e.g., transported by a human operator and/or by an automated material handling system (AMHS) in an automated factory) to the tools in substrate carriers (e.g., in a cassette or a front-opening unified pod (FOUP)). Substrates may be transferred between substrate carriers and a tool via ports located on the tool. These ports are called loadports and each loadport is adapted to receive a substrate carrier. The host or factory is any entity in the Fab that communicates with the tools. Various implementation are possible. Examples include the MES itself, a cell controller, etc.

The tools are typically designed with a limited number of loadports (e.g., 1 to 4 loadports per tool) depending on a number of factors, for example, the capacity of the tool (e.g., the number of substrates that may be processed concurrently within the tool), the throughput of the tool (e.g., the number of substrates that may be processed per hour), and the time required for the factory to exchange a substrate carrier containing processed substrates with a substrate carrier containing unprocessed substrates. Taking into account the conventional operational rules of the factory, a tool designer will attempt to include enough loadports on a tool so that there are always unprocessed substrates available on the tool's loadports to ensure that the tool can operate at its maximum efficiency and not be starved from lack of availability of unprocessed material.

Typically, once a substrate carrier is delivered to a tool (e.g., put on a loadport of the tool), the substrate carrier remains under the exclusive control of the tool until all of the substrates brought to the tool in the substrate carrier, to be processed, have been processed by the tool and returned to the substrate carrier.

Note that in some Fabs, certain "batch" tools (e.g., tools that process more than one substrate at a time), may receive input substrate carriers which deliver unprocessed substrates and possibly different output substrate carriers may be used to take away processed substrates from the batch tool. In such a system, the batch tool may indicate to the factory that processing of the input substrate carriers has been completed once the input substrate carriers have been emptied. Such batch tools require that the factory is both aware of this behavior and can determine when and where to move the empty input substrate carriers. In other words, such batch tools merely provide a "processing done" signal and the factory is required to know that this signal means that the input substrate carriers have been emptied.

In order to accomplish the exchange of substrate carriers (e.g., loading and unloading of substrate carriers), a tool and the factory will typically exchange information and collaborate during the actual exchange of substrate carriers according to a set of responsibilities defined in standardized conventional operational rules typically used in Fabs (e.g., SEMI E87).

According to such rules, the tool is responsible for determining when one of its loadports is "ready to load" or "ready to unload" a substrate carrier. When a loadport is ready to have a substrate carrier loaded, the tool sends a message to the factory informing it that the loadport is ready to receive a carrier (e.g., any carrier that requires processing and not a given carrier). The message that the tool sends includes a loadport identifier that indicates which of the tool's loadports is ready to load. When processing of a substrate carrier on a loadport has finished (e.g., processing of all the substrates originally in the carrier that were to be processed has completed), the tool sends one or more messages to the factory to indicate that the substrate carrier on the loadport is ready to be unloaded. The information sent to the factory in these messages typically includes a loadport identifier that indicates which of the tool's loadports is ready to be unloaded, and a carrier identifier for the particular substrate carrier. Finally, the tool also collaborates with the factory's agent (e.g., human operator or AMHS) responsible for loading and unloading of substrate carriers to accomplish the exchange of carriers between the factory and the tool's loadports. For example, this collaboration is typically governed by the Semiconductor Equipment and Materials International (SEMI) E84 standard entitled "Specification for Enhanced Carrier Handoff Parallel I/O Interface" in automated factories using AMHS equipment.

The factory is responsible for receiving the messages from the tool indicating that a given loadport is ready to load or ready to unload a carrier. If the tool loadport is ready to receive a carrier, the factory determines which carrier should be delivered next to the tool's loadport and then dispatches an agent (e.g., a human operator or an AMHS) to deliver that specific carrier. If the tool loadport is ready to have a carrier unloaded, the factory is responsible for determining what the next destination for the carrier should be (e.g., storage or a next process/metrology tool) and then dispatch an agent (e.g., a human operator or an AMHS) to unload the carrier from the tool's loadport and transport the substrate carrier to the next destination.

As can be seen from the responsibilities defined by the conventional operational rules described above, the tools ask for any carrier to be delivered to their loadport and not specific carriers. The factory makes the determination of which carrier should be delivered to satisfy this request. Similarly, the tools do not request that a carrier be unloaded from the loadports until all the carrier's substrates to be processed have been processed and returned back into the carrier. (Note that an exception to this typical operating rule set is batch tools mentioned above in which the destination/output carrier for the processed substrates is different than the source/input carrier and the factory has so informed the tool to operate in this mode. In this case the tool will ask for the input carrier to be unloaded from the loadport as soon as the substrates have been removed for processing).

Thus, based on typical operational rules, a carrier may occupy a tool loadport in three distinct states: (1) a first state in which the substrate carrier contains unprocessed substrates and the tool will be retrieving these substrates for processing; (2) a second state in which the substrate carrier has been emptied and is waiting for the return of processed substrates; and (3) a third state in which the tool is putting processed substrates back into the substrate carrier. Note that the first and third states may overlap or exist concurrently. When the first and third states exist concurrently, the second state does not occur. However, on tools with high capacity (e.g., tools in which the number of substrates in process is larger than the number of substrates that need processing in a given carrier), the second state will occur and may last for an extended period of time compared to the first and third states. During the second state, the loadport, which is a limited resource on the tool, is not being used productively. This condition will be especially true and become progressively worse as the lot size (e.g., the number of substrates per carrier) is reduced in the factories in order to reduce the Fabs cycle time. As the lot size is reduced further and further in Fabs, conventional operating rules and procedures will result in loadports becoming the bottleneck in a tool's productivity and tools will be starved for the lack of available unprocessed substrates.

One possible solution to the problem of the loadports becoming a bottleneck in a tool's productivity as lot sizes are reduced is to add more loadports to the design of a tool. While adding more loadports may allow the accommodation of smaller lot sizes, this solution may not be practical if tools must be substantially redesigned, manufactured, and re-qualified to add additional loadports.

The inventors of the present invention have recognized that by modifying or extending conventional operating rules that are typically used to govern the interaction between the factory and tool, the Fab can avoid the problem of reduced lot sizes causing starvation of tools equipped with only a conventional number of loadports. According to the present invention, by modifying the conventional operating rules in a manner that allows the factory and tools to exchange information and collaborate to minimize the amount of time loadports are in the second state described above, the efficiency of loadport utilization may be greatly improved. Specifically, the factory/tool interaction may be adapted and extended so that substrate carriers may be unloaded from tool loadports once all unprocessed substrates have been removed and the substrate carriers are waiting to be refilled (e.g., when the loadports would otherwise be waiting in the second state described above). The rules may be further modified/extended to allow the unloaded substrate carriers to be reloaded to the tool's loadports just before the tool is ready to put processed substrates back into the carriers. These modifications/extensions facilitate a more efficient use of the loadports since the amount of time spent by a substrate carrier on a loadport in the second state is minimized. Therefore, with such modifications the tools may operate at peak throughput rates with a conventional number of loadports even as the lot sizes are reduced.

A significant difference between conventional operating rules and the modified and/or extended rules of the present invention is (1) the ability for a tool to ask the factory to unload a carrier when it is empty (or does not contain any unprocessed substrates), decide if this carrier is needed at a later time, and indicate so to the factory, and (2) to be able to ask that a specific carrier be loaded back on a loadport when the substrates originally brought to the tool in the carrier, are ready to be returned back to the carrier. In this modified mode of operation, the responsibilities of the tool and the factory are redefined from what they were under the conventional operating rules described above.

Under the modified operating rules of the present invention, the tool remains responsible for determining when an associated loadport is "ready to load" or "ready to unload" a carrier. However, under the modified operating rules there may be additional situations in which a substrate carrier is to be loaded onto a tool's loadport. For example, a loadport may be ready to load (e.g., receive) a substrate carrier when additional unprocessed substrates are needed or when a specific substrate carrier (which was previously unloaded from the loadport) is needed back in order to put processed substrates back into the substrate carrier. Where substrates are permitted to be returned back to a substrate carrier that is different than the substrate carrier within which the substrates originally arrived at the tool, the substrate carrier that the tool will use may be restricted to substrate carriers that meet a predefined set of criteria. For example, the tool may choose to only use an empty substrate carrier or a substrate carrier that is both empty and adapted to only accept certain types of substrates.

Once the tool determines that a loadport is ready to load (e.g., receive) a substrate carrier, the tool may send one or more messages to the factory informing the factory of the tool's request. The information exchanged in these messages may include a loadport identifier and the type of substrate carrier that the loadport is ready to load (e.g., receive). There may be several different types of substrate carriers. A first type may include any substrate carrier with unprocessed substrates (in which case the factory may determines which substrate carrier to deliver to the loadport). A second type may include a specific substrate carrier. The substrate carrier may be identified by a substrate carrier identifier or other unique (e.g., per substrate carrier) number that has been agreed to between the factory and the tool. A third type may include substrate carriers that meet a specific criterion, for example, an empty substrate carrier; a substrate carrier adapted to hold copper substrates; a non-product (e.g., dummy) substrate carrier; etc. The types of substrate carriers and the criteria may vary between different Fabs.

A loadport may be ready to unload a substrate carrier from a tool in a number of different situations. Once a substrate carrier has completed processing, in other words, all the substrates have been processed and returned to the carrier, the substrate carrier is ready to be unloaded (e.g., removed) from the loadport. In addition, when all of a substrate carrier's unprocessed substrates have been removed for processing and the substrate carrier is no longer needed by the tool (e.g., in cases where input and output substrate carriers for the substrates are different), the substrate carrier is ready to be unloaded (e.g., removed) from the loadport. Further, when all of a substrate carrier's unprocessed substrates have been removed for processing and the substrate carrier is only going to be needed by the tool after some amount of time, the substrate carrier is ready to be unloaded (e.g., removed) from the loadport. An example of this situation may occur when substrates have to be returned back to the same substrate carrier (e.g., the input and output substrate carrier is the same) but the substrate carrier is stalled in the second state (described above) for a long enough time to justify unloading and reloading at a later time.

Once the tool determines that the substrate carrier may be unloaded from the tool's loadport, the tool may send one or more messages to the factory informing the factory of the tool's request. The information that is sent to the factory in these messages may include a loadport identifier of a loadport that is ready to unload (e.g., ready to have a substrate carrier removed) and information pertaining to the substrate carrier that is to be unloaded. Information pertaining to the substrate carrier to be unloaded allows the factory to determine how to disposition the requested unload. The information may include for example, an identifier of the substrate carrier (e.g., a substrate carrier ID); an indication of whether the substrate carrier will need to be reloaded at a later time; and an estimate of how long before the substrate carrier will be reloaded, if at all. This information allows the factory to unload the substrate carrier without having to dispatch the substrate carrier to a next process step as would be required under conventional operating rules. This information also allows the factory to determine how close to the tool to store the substrate carrier so the carrier may be retrieved when/if latter needed.

Under the modified operating rules of the present invention, the tool remains responsible for collaborating with the factory's agent (e.g., human operator, AMHS, etc.) that is responsible for loading and unloading substrate carriers to accomplish the exchange of substrate carriers between the factory and the tool's loadports. As mentioned above, this is typically governed by the SEMI E84 standard in automated factory's using AMHS equipment.

The factory is responsible for receiving messages from the tool indicating that a given loadport is ready to load or ready to unload a substrate carrier. Depending on the type of substrate carrier that the tool's loadport is ready to receive (e.g., based on the information sent by the tool) the factory is also responsible for determining which substrate carrier should be delivered and then dispatching the agent (e.g., a human operator, an AMHS, etc.) to deliver that specific substrate carrier.

If the tool's loadport is ready to unload a substrate carrier, the factory is also responsible to determine how to disposition the request based on the information provided as part of the "ready to unload" requests. If the substrate carrier to be unloaded is completed (e.g., all substrates to be processed have been processed and returned to the carrier) then the factory determines what the next destination for the substrate carrier should be (e.g., storage or the next process/metrology tool).

If the substrate carrier to be unloaded will be reloaded at a later time, the factory will unload the substrate carrier and move the carrier to a storage location pending a request from the tool to reload the substrate carrier.

When the tool provides an estimate indicating when the substrate carrier will be needed again, the factory may use this information to determine a preferred proximity of the storage location (to the tool) in which to store the substrate carrier. Where a substrate carrier must be stored a substantial distance from the tool, the estimated reload time may also allow the factory to pre-position (e.g., at an intermediate location) the substrate carrier closer to the tool just prior to the actual reload request for the substrate carrier and thus, reduce the waiting time while the substrate carrier is transported to the tool's loadport after the tool request's the substrate carrier to be reloaded.

Once the factory has determined a next destination for the substrate carrier, the factory may then dispatch the agent (e.g., a human operator, an AMHS, etc.) to unload the substrate carrier from the tool's loadport and transport it to its next destination.

In addition to the information exchange described above, the factory may also provide information to the tool about substrate carriers and their content (e.g., substrates) that are planned to be processed on the tool in the near future. This information may allow the tool to better manage (e.g., improve efficiency) the unloading of substrate carriers that will be reloaded later. For example, if no additional substrate carriers are queued for processing on a given tool, there is no benefit to be gained from unloading a substrate carrier (that needs to be reloaded later) to make room for additional unprocessed substrate carriers. In another example, if the factory informs the tool of the number of unprocessed substrates in the substrate carrier that the factory is planning to deliver to the tool, the tool may decide whether, for example, another substrate carrier that is currently in the second state described above on a loadport should be unloaded from the tool.

Turning to other aspects of the present invention, enhanced carrier handlers are adapted to accept transfer commands for carriers before the carriers actually arrive within the domain of the carrier handler. This allows a carrier handler to avoid having to wait until a carrier arrives and then having to wait further for the MCS to issue a transfer command after informing the MCS of the arrival of the carrier. Thus, using the present invention the carrier handler is able to anticipate the arrival of a carrier and facilitate improved performance and scheduling.

The carrier handler of the present invention may also be adapted to accept termination commands that result in prior transfer commands being cancelled or aborted independent of the state of the prior commands. In other words, regardless of whether a transfer command is active or queued, a single termination command can be used to cancel a queued transfer command or abort an active transfer.

In addition, a carrier handler according to the present invention may be adapted to identify a queued command that could be executed using a carrier support that is both available for use and the soonest to arrive at the carrier handler. The identified command may be selected out-of-order from the command queue for execution. This aspect of the present invention may allow improved throughput of the transport system and carrier handler by transferring carriers more efficiently and avoiding a carrier support having to circulate around the fabrication facility unnecessarily. Likewise, to further enhance throughput, queued commands may be selected for execution based upon the actual or estimated times it will take to perform the selected commands. A database may be employed to store the time required to execute each of the different transfers and/or commands the carrier handler may perform. In some embodiments, a scheduler for the carrier handler may not commit to executing a transfer command to/from the transport system until the last possible moment before the carrier handler must begin to prepare for such a transfer based on the estimated/actual times in the database.

Further, the carrier handlers of the present invention may also be adapted to remove empty carriers from associated tools to improve port availability. Thus, the present invention may remove substrates from a tool in a carrier different than in which the substrates arrived at the tool. Because the present invention facilitates ports being made available for newly arriving carriers holding unprocessed substrates, tool "starvation" may be avoided.

In some embodiments, the present invention enables the carrier handler to continue to operate even after a failed transfer. Internal storage locations of an inventive carrier handler may be tracked in a database or through the use of another mechanism. Upon determining that a transfer to (or from) an internal storage location has failed, the internal storage location associated with the failed transfer may be marked as unavailable and removed from a usable locations list.

In alternative or additional embodiments of the present invention, a carrier handler may include sensors to verify that a transfer destination is available and unobstructed before making an actual transfer. In other words, the status of a transfer destination may be sensed using, for example, an electric eye mounted on an end effector of the carrier handler. The actual status may be compared against stored status to detect any anomalies and avoid any collisions. Likewise, a pressure sensor/weight transducer for example, may be used to determine that a carrier is properly supported by the carrier handler and/or contains the expected number of substrates.

Carrier handlers according to the present invention may also be adapted to self-calibrate carrier handoffs to/from the transport system. Using a "calibration carrier" equipped with sensors and/or a communications facility, a carrier handler may be provided with sufficient information to calibrate for a handoff as, for example, the calibration carrier is moved past the carrier handler on the transport system. For example, a calibration carrier may emit a signal indicating that the calibration carrier detected that the carrier handler's end effector failed to match speed with the calibration carrier in a last pass and that the end effector may need to be moved faster.

An electronic device manufacturing or fabrication facility (Fab) may use an overhead transport system (OHT system) that includes a plurality of carrier supports or "cradles" coupled to a continuously moving conveyor system adapted to transfer one or more substrate carriers about the facility. More specifically, the moving conveyor system may include a band and a plurality of drive motors coupled thereto, which are adapted to move the band.

Further, such a facility may include tools or composite tools adapted to process a substrate during electronic device manufacturing. Each processing tool may be coupled to a respective carrier handler adapted to transfer a substrate carrier between the tool and the moving conveyor system. More specifically, each processing tool may be coupled to a respective carrier handler adapted to transfer a substrate carrier between a load port of the processing tool and a carrier support coupled to the band of the continuously moving conveyor system. In this manner, a substrate carrier may be transferred about the facility.

In addition, a transport system may include a control system adapted to communicate with and control operation of the moving conveyor system and a plurality of carrier handlers such that substrate carriers may be moved to where they are needed. Turning to FIG. 1, a control system 100 may include a host or MCS 102 that is in two-way communication with loading station software (LSS) 104a-f executing on each of the controllers of each of the plurality of carrier handlers housed in and/or under the control of substrate loading stations. The host may include a manufacturing execution system (MES) that directs the operations of the MCS. The MCS 102 may also be in two-way communication with a transport system controller (TSC) 106 that maintains the operation of the transport system including drive motors and the conveyor. In some embodiments, each of the LSS 104a-f nodes may communicate with the TSC 106 to directly exchange information regarding the status of the transport system. These components and their operation are described in more detail below with respect to FIG. 2.

Figure 2:
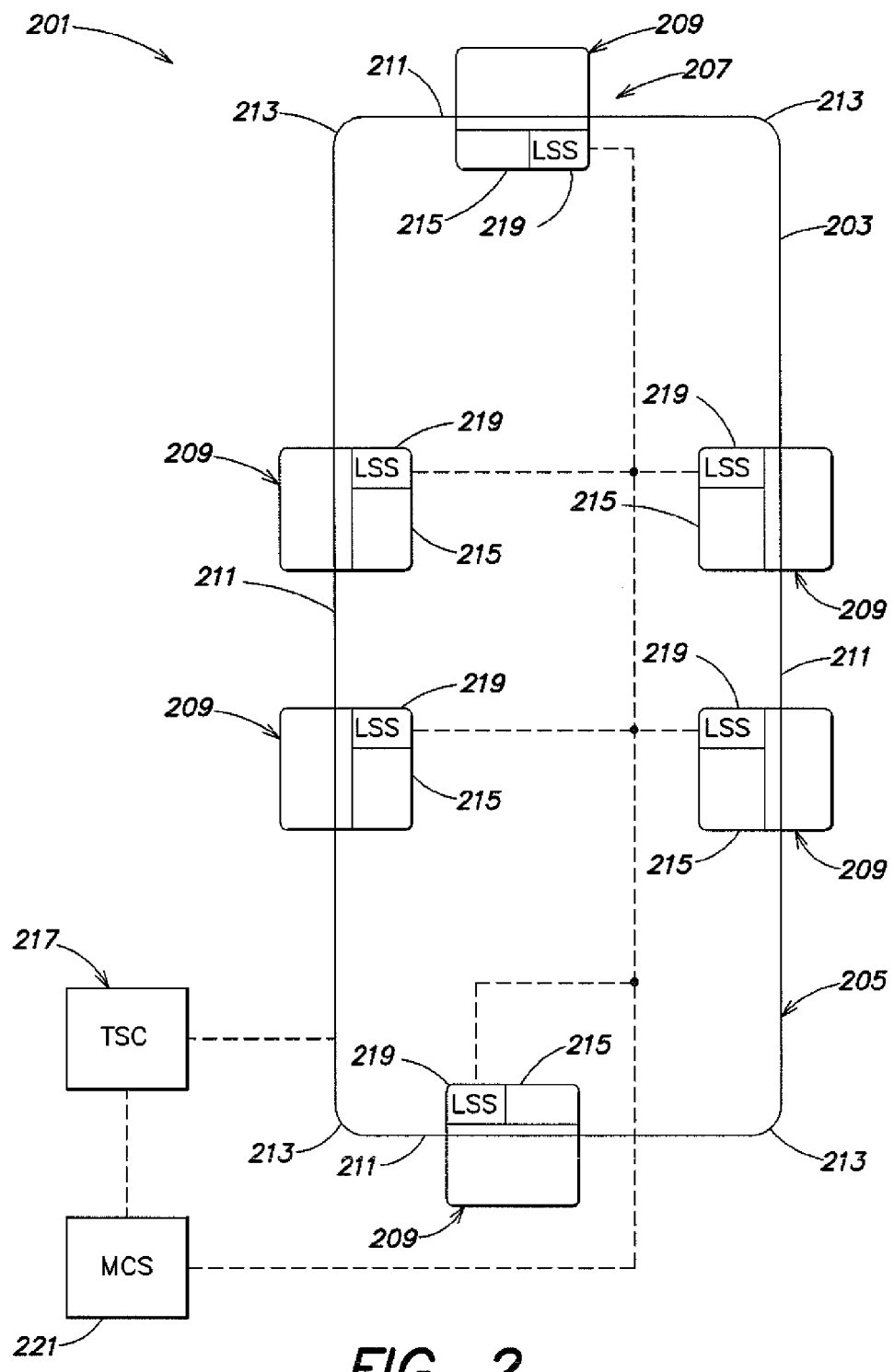
FIG. 2 is a schematic diagram depicting an example of an electronic device manufacturing facility according to some embodiments of the present invention.

Turning to FIG. 2, a schematic diagram is provided depicting an example embodiment of a physical arrangement of an example Fab 201 that is especially well suited for using small lot size substrate carriers, such as substrate carriers that hold a single substrate or substantially fewer than twenty-five substrates (e.g., five or less). The depicted Fab 201 includes a high-speed transport system with several features that make it particularly suitable for using small lot carriers including: a high-speed, low maintenance, constantly moving conveyor system; a carrier loading/unloading function that does not require stopping or slowing the conveyor; a conveyor that is able to physically support many carriers at one time; a flexible conveyor that may be readily customized to a desired transport path; and control software adapted to efficiently manage transport and transfers between process tools. These features are described further below.

Previously incorporated U.S. patent application Ser. No. 10/650,310, filed Aug. 28, 2003 and titled "System For Transporting Substrate Carriers", discloses a substrate carrier transport system or similar delivery system that includes a conveyor for substrate carriers that is intended to be constantly in motion during operation of the Fab which it serves. The constantly moving conveyor is intended to facilitate transportation of substrates within the Fab so as to reduce the total "dwell" time of each substrate in the Fab.

To operate a Fab in this manner, methods and apparatus may be provided for unloading substrate carriers from the conveyor, and for loading substrate carriers onto the conveyor, while the conveyor is in motion. Previously incorporated U.S. patent application Ser. No. 10/650,480, filed Aug. 28, 2003 and titled "Substrate Carrier Handler That Unloads Substrate Carriers Directly From a Moving Conveyor", discloses a substrate carrier handler at a substrate loading station or "loading station" that may perform such loading/unloading operations with respect to a moving conveyor.

Figure 3:
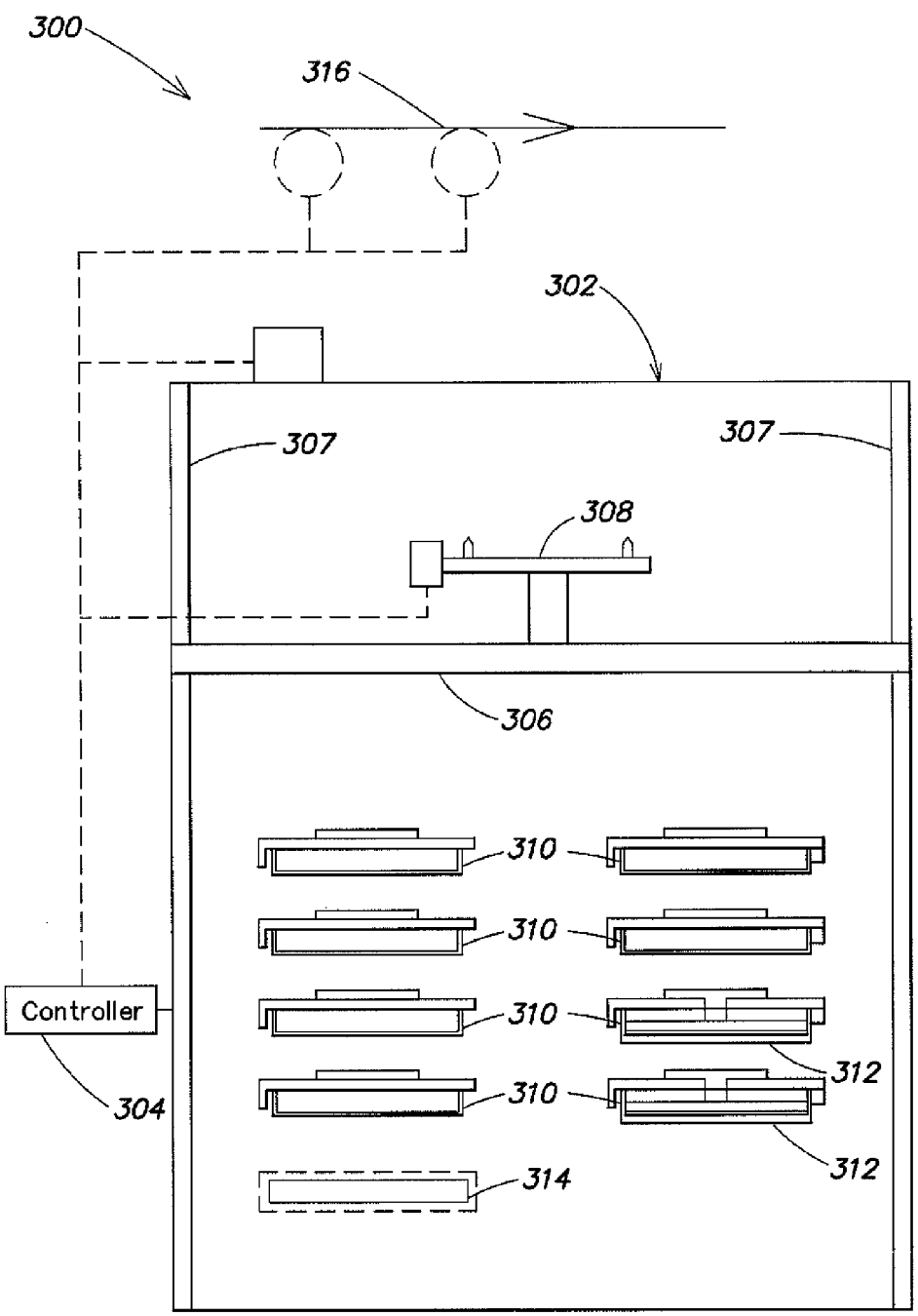
FIG. 3 is a front elevational view depicting an example of a carrier handler according to some embodiments of the present invention.

Turning to FIG. 3, a substrate loading station 300 equipped with a carrier handler 302 may include a controller 304, a horizontal guide 306 that is moveable vertically along a frame 307 or rails, and an end effector 308 that is moveable horizontally along the horizontal guide 306. Other configurations (e.g., a robot that can move in more than two dimensions) for moving the end effector 308 to execute transfers may be employed. A carrier handler 302/substrate loading station 300 may further include internal storage locations 310 or shelves/hangers for temporarily storing substrate carriers 312. In addition, ports 314 for loading substrates into process tools (not shown) may be accessible to the carrier handler 302 or be part of a substrate loading station 300 housing a carrier handler 300.

The controller 304 may be implemented using a field programmable gate array (FPGA) or other similar device. In some embodiments, discrete components may be used to implement the controller 304. The controller 304 may be adapted to control and/or monitor the operation of the substrate loading station 300 and one or more of various electrical and mechanical components and systems of the substrate loading station 300 which are described herein. The controller 304 may be adapted to execute loading station software as indicated above. In some embodiments, the controller 304 may be any suitable computer or computer system, or may include any number of computers or computer systems.

In some embodiments, the controller 304 may be or may include any components or devices which are typically used by, or used in connection with, a computer or computer system. Although not explicitly pictured in FIG. 3, the controller 304 may include one or more central processing units, read only memory (ROM) devices and/or a random access memory (RAM) devices. The controller 304 may also include input devices such as a keyboard and/or a mouse or other pointing device, and output devices such as a printer or other device via which data and/or information may be obtained, and/or a display device such as a monitor for displaying information to a user or operator. The controller 304 may also include a transmitter and/or a receiver such as a LAN adapter or communications port/system/adapter for facilitating communication with other system components and/or in a network environment, one or more databases for storing any appropriate data and/or information, one or more programs or sets of instructions for executing methods of the present invention, and/or any other computer components or systems, including any peripheral devices.

According to some embodiments of the present invention, instructions of a program (e.g., controller software) may be read into a memory of the controller 304 from another medium, such as from a ROM device to a RAM device or from a LAN adapter to a RAM device. Execution of sequences of the instructions in the program may cause the controller 304 to perform one or more of the process steps described herein. In alternative embodiments, hard-wired circuitry or integrated circuits may be used in place of, or in combination with, software instructions for implementation of the processes of the present invention. Thus, embodiments of the present invention are not limited to any specific combination of hardware, firmware, and/or software. The memory may store the software for the controller which may be adapted to execute the software program, and thereby operate in accordance with the present invention, and particularly in accordance with the methods described in detail below. Portions of the present invention may be embodied as a program developed using an object oriented language that allows the modeling of complex systems with modular objects to create abstractions that are representative of real world, physical objects and their interrelationships. However, it would be understood by one of ordinary skill in the art that the invention as described herein can be implemented in many different ways using a wide range of programming techniques as well as general purpose hardware sub-systems or dedicated controllers.

The program may be stored in a compressed, uncompiled and/or encrypted format. The program furthermore may include program elements that may be generally useful, such as an operating system, a database management system and device drivers for allowing the controller to interface with computer peripheral devices and other equipment/components. Appropriate general purpose program elements are known to those skilled in the art, and need not be described in detail herein.

As indicated above, the controller 304 may generate, receive, and/or store databases including data related to carrier locations, command queues, actual and/or estimated command execution times, and/or internal storage locations. As will be understood by those skilled in the art, the schematic illustrations and accompanying descriptions of the structures and relationships presented herein are merely exemplary arrangements. Any number of other arrangements may be employed besides those suggested by the illustrations provided.

In operation, to unload a substrate carrier 312 from a transport system 316 that includes a moving conveyor that transfers substrate carriers 312 (also referred to as a "substrate carrier conveyor" 316) and that passes by the carrier handler 302, the end effector 308 is moved horizontally at a velocity that substantially matches the velocity of the substrate carrier 312 as it is being transported by the substrate carrier conveyor 316 (e.g., by substantially matching substrate carrier speed in a horizontal direction). In addition, the end effector 308 may be maintained in a position adjacent the substrate carrier 312 as the substrate carrier 312 is being transported. The end effector 308 thus may substantially match a position of the substrate carrier 312 while substantially matching a velocity of the substrate carrier 312. Likewise, conveyor position and/or velocity may be substantially matched.

While the end effector 308 substantially matches the substrate carrier's velocity (and/or position), the end effector 308 is raised so that the end effector 308 contacts the substrate carrier 312 and disengages the substrate carrier 312 from the substrate carrier conveyor 316. A substrate carrier 312 similarly may be loaded onto the moving substrate carrier conveyor 316 by substantially matching end effector 308 and conveyor velocities (and/or positions) during loading. In at least one embodiment, such substrate carrier handoffs between the end effector 308 and substrate carrier conveyor 316 are performed at a substantially zero velocity and/or acceleration difference between the end effector 308 and the substrate carrier conveyor 316.

Previously incorporated U.S. patent application Ser. No. 10/764,982, filed Jan. 26, 2004 and titled "Methods and Apparatus for Transporting Substrate Carriers", describes a conveyor system that may be employed with the above-described substrate carrier transport system 316 and/or carrier handler 302 for transporting substrate carriers between one or more processing tools of a electronic device manufacturing facility. The conveyor system may include a ribbon (or "band") that forms a closed loop within at least a portion of the electronic device manufacturing facility and that transports substrate carriers therein. In one or more embodiments, the ribbon or band may be formed from stainless steel, polycarbonate, composite materials (e.g., carbon graphite, fiberglass, etc.), steel or otherwise reinforced polyurethane, epoxy laminates, plastic or polymer materials that include stainless steel, fabric (e.g., carbon fiber, fiberglass, Kevlar® available from Dupont, polyethylene, steel mesh, etc.) or another stiffening material, etc. By orienting the ribbon so that a thick portion of the ribbon resides within a vertical plane and a thin portion of the ribbon resides within a horizontal plane, the ribbon is flexible in the horizontal plane and rigid in the vertical plane. Such a configuration allows the conveyor to be constructed and implemented inexpensively. For example, the ribbon requires little material to construct, is easy to fabricate and, due to its vertical rigidity/strength, can support the weight of numerous substrate carriers without supplemental support structure (such as rollers or other similar mechanisms used in conventional, horizontally-oriented belt-type conveyor systems). Furthermore, the conveyor system is highly customizable because the ribbon may be bent, bowed or otherwise shaped into numerous configurations due to its lateral flexibility.

Turning back to FIG. 2, the example Fab 201 includes a ribbon or band 203 that forms a simple loop 205 within the Fab 201. The ribbon 203 may comprise, for example, one of the ribbons described in previously incorporated U.S. patent application Ser. No. 10/764,982. The ribbon 203 transports substrate carriers (not shown) between processing tools 209, and comprises straight portions 211 and curved portions 213 to form the (closed) loop 205. Other number of processing tools 209 and/or loop configurations may be employed.

Each processing tool 209 may include a substrate carrier handler at a substrate loading station or "loading station" 215 of the processing tool 209 for unloading a substrate carrier from or for loading a substrate carrier onto the moving ribbon 203 of the conveyor system 207 as the ribbon 203 passes by the loading station 215 (as described in previously incorporated U.S. patent application Ser. No. 10/650,480). For example, an end effector 308 (FIG. 3) of a loading station 215 may be moved horizontally at a velocity that substantially matches the velocity of the substrate carrier as it is being transported by the ribbon 203, maintained in a position adjacent the substrate carrier as the substrate carrier is being transported and raised so that the end effector contacts the substrate carrier and disengages the substrate carrier from the conveyor system 207. A substrate carrier similarly may be loaded onto the moving ribbon 203 by substantially matching end effector 308 (FIG. 3) and ribbon velocities (and/or positions) during loading.

Each loading station 215 may include one or more ports (e.g., load ports) or similar locations where substrates or substrate carriers are placed for transfer to and/or from a processing tool 209 (e.g., one or more docking stations, although transfer locations that do not employ docking/undocking movement may be employed). Various substrate carrier storage locations or shelves also may be provided at each loading station 215 for substrate carrier buffering at a processing tool 209.

The conveyor system 207 may include a TSC 217 for controlling operation of the ribbon 203. For example the TSC 217 may control/monitor the speed and/or status of the ribbon 203, allocate carrier supports of the ribbon 203 that are used to support/transport substrate carriers, monitor the status of such carrier supports, provide such information to each loading station 215 or the like. Likewise, each loading station 215 may include loading station software (LSS) 219 for controlling carrier handler operation (e.g., loading or unloading of substrate carriers to/from the conveyor system 207, transporting of substrate carriers to/from load ports or storage locations of the loading station 215 and/or processing tool 209 serviced by the loading station 215, etc.). A MCS 221 communicates with the transport system controller 217 and the loading station software 219 of each loading station 215 for affecting operation of the same. The TSC 217, each LSS 219 and/or the MCS 221 may include a scheduler (not shown) for controlling scheduling of the operations performed by the TSC 217, LSS 219 and/or the MCS 221.

Process Descriptions

The system discussed above, including the hardware and software components, are useful to perform the methods of the invention. However, it should be understood that not all of the above described components are necessary to perform any of the present invention's methods. In fact, in some embodiments, none of the above described system is required to practice the present invention's methods. The system described above is an example of a system that would be useful in practicing the invention's methods and is especially well suited for transferring small lot size substrate carriers, such as substrate carriers that hold a single substrate or substantially fewer than twenty-five substrates (e.g., five or less).

Referring to FIGS. 4 through 11, flowcharts are depicted that represent some embodiments of the present invention that may be performed using the systems described above. It must be understood that the particular arrangement of elements in the flowcharts of FIGS. 4 through 11, as well as the number and order of example steps of various methods discussed herein, is not meant to imply a fixed order, sequence, quantity, and/or timing to the steps; embodiments of the present invention can be practiced in any order, sequence, and/or timing that is practicable.

In the subsections that follow, method steps will be discussed in detail. Note that not all of these steps are required to perform the methods of the present invention and that additional and/or alternative steps are also discussed below. Also note that the general steps depicted in the flowcharts represent features of only some of the embodiments of the present invention and that they may be re-ordered, combined and/or subdivided in any number of different ways so that methods of the present invention include more or fewer actual steps. For example, in some embodiments many additional steps may be added to update and maintain databases described below, but as indicated, it is not necessary to use such databases in all embodiments of the invention. In other words, the methods of the present invention may contain any number of steps that are practicable to implement the several different inventive processes described herein.

As indicated above, the MCS 221 is responsible for delivery and storage of carriers in a bay, by sending commands to various equipment, which include substrate loading stations/carrier handlers and transfer stations (equipment that may perform conveyor band to band transfers, not shown herein). In some embodiments, certain aspects of the carrier handler may me implemented in conformance with an industry standard entitled the SEMI E88-1103 standard "Specification for AMHS Storage SEM (Stocker SEM)", which in particular details standardized commands and protocols for control of compliant devices. Likewise, a TSC 117, which is responsible for controlling conveyor operation, may be implemented in conformance with the SEMI E82-0703 standard "Specification for Interbay/Intrabay AMHS SEM (IBSEM)". Interactions with a tool's port may me implemented in conformance with the SEMI E84-0703 standard "Specification for Enhanced Carrier Handoff Parallel I/O Interface" and handling of carriers may be implemented in conformance with the SEMI E87-0703 standard "Specification for Carrier Management (CMS)". These four standards are published by the Semiconductor Equipment and Materials International (SEMI) industry coalition group of San Jose, Calif. (www.semi.org) and are hereby incorporated by reference herein for all purposes.

Embodiments of the present invention implement features beyond the functions described in the above referenced SEMI standards. More specifically, the present invention adds enhanced functions to the SEMI E88 standard to further improve the efficiency and throughput of a Fab that uses small lot size carriers. A general goal in single or small lot size substrate processing is to reduce delays resulting from the time between a carrier arriving at the port of a SEMI E88 compliant stocker-type device, such as a substrate loading station with a carrier handler, and the MCS acknowledging the arrival and sending a command to move the carrier to a final destination. For carriers designed to hold a single substrate, since the number of carriers arriving at a carrier handler may be twenty-five times more than that of a conventional delivery system, the cumulative delay may become significant. The SEMI E88 specification requires that the HOST/MCS send a transfer command to a carrier handler (e.g., stocker equipment) only after the arrival of the carrier at a load port of the associated substrate loading station (e.g., a shelf or similar intermediate storage location of the substrate loading station from which the carrier then may be transferred to a port of a processing tool serviced by the substrate loading station). This requirement results in cumulative delays in moving carriers to the destination port. According to the SEMI E88 specification, if a transfer command is issued to a stocker and the specified carrier does not exist within the stocker's domain, the stocker would respond with an error. The error is properly generated in conformance with the SEMI E88 standard because the stocker cannot perform the command on a carrier not in the stocker's domain.

Semi E88 Enhancements

Embodiments of the present invention extend the SEMI E88 standard to allow the substrate loading station to accept a transfer command prior to the arrival of an associated carrier (e.g., without prior knowledge of the existence of the specified carrier), in anticipation of the carrier's arrival. Such an enhanced transfer command may identified as an "expected carrier" transfer by the use of an additional parameter within the command. The substrate loading station may defer the processing of such transfer commands until the specified carrier enters the domain of the substrate loading station. Upon entering the domain of the substrate loading station, an expected carrier command may be processed in order of its priority in a command queue of the carrier handler.

More specifically, according to some embodiments of an implementation of an enhanced E88 specification of the present invention, if an expected carrier transfer command is received, the substrate loading station may return a reply to the MCS that the command will be completed later. The substrate loading station may keep the command in the carrier handler's queue until the carrier arrives and when the carrier does arrive, the command may be executed as per the MCS request. In addition to avoiding introducing delays waiting for a transfer command after a carrier arrives, the present invention also allows a scheduler of the substrate loading station to plan for more efficient carrier transfers, e.g., directly from the transport system to a port of a processing tool, instead of having to put newly arriving carriers into temporary storage locations.

Figure 4:
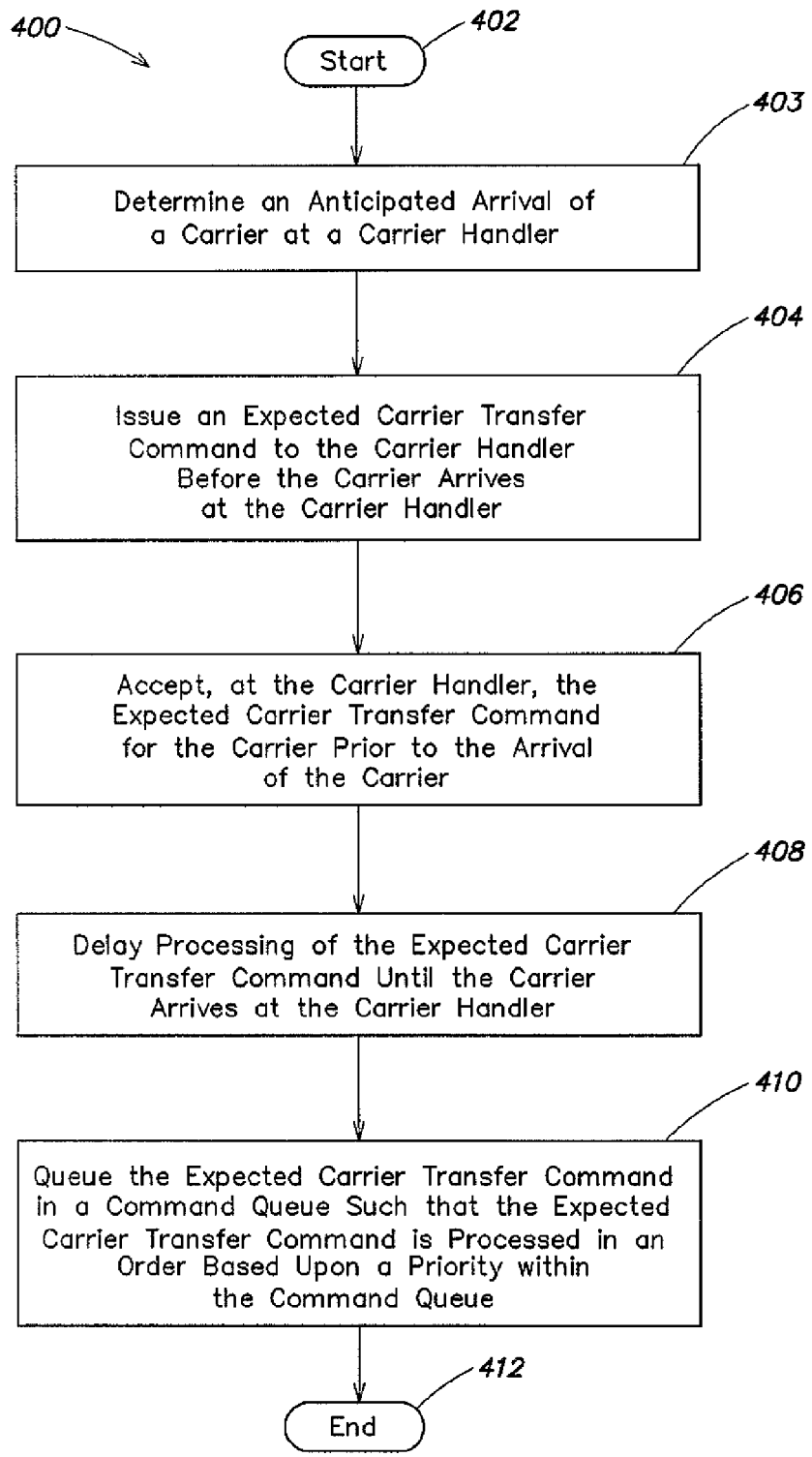
FIG. 4 is a flowchart depicting an example process for accepting a transfer command before a carrier arrives at a carrier handler according to some embodiments of the present invention.

Turning to FIG. 4, an example process 400 for accepting a transfer command before a carrier arrives at a carrier handler is depicted. The process 400 starts at step 402. In Step 404, the MCS is aware that, or determines that, a carrier is being transported to a destination carrier handler, possibly as a result of a source carrier handler having loaded the carrier onto the transport system, for example. In step 404, before the carrier arrives at the destination carrier handler, the MCS issues a transfer command to the destination carrier handler with an "expected carrier" parameter set. In step 406, the destination carrier handler accepts and acknowledges the expected carrier transfer command even though the specified carrier handler has not yet arrived at the destination carrier handler. In step 408, processing of the expected carrier transfer command is delayed until the specified carrier appears within the domain of the destination substrate loading station (e.g., arrives at the destination carrier handler). In step 410, the expected carrier transfer command is queued in the command queue of the destination carrier handler were it may be processed in order based upon a priority within the queue. In step 412, the example process 400 for accepting a transfer command before a carrier arrives at a carrier handler ends.

In some alternative embodiments, in step 408, the expected carrier transfer command may be queued in the command queue of the destination carrier handler upon receipt and, in step 410, execution of the expected carrier transfer command may be scheduled to commence based upon an anticipated arrival time of the carrier.

The SEMI E82 and SEMI E88 standards define a number of commands for remote operation. In particular, two remote commands are defined for abort and cancel for use in terminating transfer commands in automated material handling systems. The abort command terminates the activity of a specific transfer command based on a command identifier while the command is in the active state. The cancel command terminates the activity of a specific transfer command based on command identifier while the command is in either the queued or waiting state.

An additional enhancement of the SEMI E88 and E82 standards according to the present invention involves consolidating related commands that were intended to apply to different command execution states. For example, the abort command intended to terminate active commands and the cancel command intended to terminate queued commands may be consolidated into a single termination command. A general goal in single or small lot size substrate processing is to reduce the number of messages between the HOST/MCS and SEMI-E88 compliant stocker-type equipment, such as a substrate loading station. As indicated above, the SEMI E88 specification requires that the HOST/MCS send a cancel command to cancel a transfer if it is in the queued state and send an abort command to abort a transfer if it is in the active state. This requirement results in cumulative unnecessary extra messaging, particularly when the state of the transfer changes right after the HOST/MCS has issues a cancel command and before the stocker processes this command.

An embodiment of the present invention extends the SEMI E88 specification to allow for a new termination command (e.g., AbortOrCancel), which results in the cancellation or aborting of a transfer depending on whether it is in the queued or active state. Thus, the new termination command terminates the activity of a specific transfer command based on a command identifier only, independent of the command state. As a result, the termination command may be used in place of either the abort or cancel commands without regard to the command state. This usage results in less code needed to implement several functions.

Figure 5:
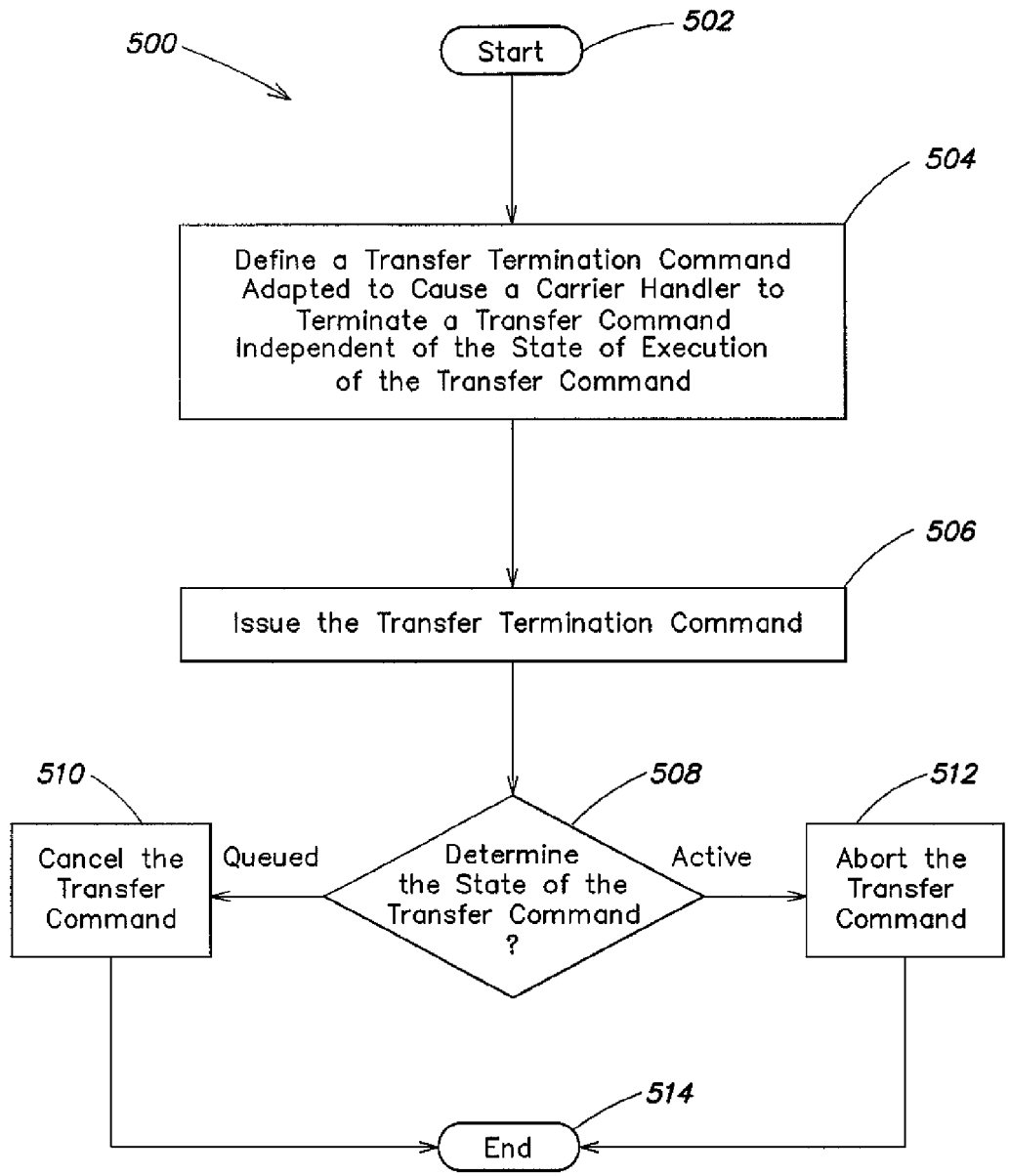
FIG. 5 is a flowchart depicting an example process for terminating a transfer command independent of the command's execution status according to some embodiments of the present invention.

Turning to FIG. 5, an example process 500 for terminating a transfer command independent of the command's execution status is depicted. The process 500 commences at step 502. In step 504, a termination command is defined that aborts or cancels a transfer regardless of whether the transfer is active, queued, or waiting. In step 506, the termination command is issued by the MCS. In step 508, the substrate loading station controller receives the termination command and determines the state of the transfer command identified in the termination command. If the specified transfer command is queued or waiting, the transfer command is canceled in step 510. If the specified transfer command is active, the transfer command is aborted in step 512. In either case, the process 500 ends in step 514.

Look-Ahead Scheduling of a Substrate Loading Station

A substrate loading station's carrier handler actively places or removes carriers onto/from specific locations of a transport system (e.g., cradles or other supporting locations). Since the transport system does not stop at the substrate loading station for such transfers, the carrier handler must be in place to make such transfers prior to the arrival of the target carrier support (e.g., before a cradle supporting the carrier to be unloaded, or the cradle onto which the carrier is to be loaded, arrives). A goal of the scheduler of a substrate loading station is to insure that the placement or removal of a carrier at a carrier support on the transport system is done the first time the carrier support passes by the substrate loading station.

To improve the chances of achieving this goal, the present invention provides the scheduler of the carrier handler with a look-ahead feature in its logic for deciding which transfer command in the command queue to initiate next. This look-ahead feature may take into account the anticipated time of the earliest arriving carrier support for initiating a transfer to load a carrier onto a carrier support of a moving conveyor (e.g., place-on-cradle) or to unload a carrier from a carrier support of a moving conveyor (e.g., remove-from-cradle). For example, before performing a transfer to/from a port of a processing tool serviced by the substrate loading station, the scheduler logic of the substrate loading station may also take into account the time required to perform such a transfer and whether enough time exists to perform such a transfer and also be ready for a transfer to/from the transport system using the earliest arriving carrier support.

Figure 6:
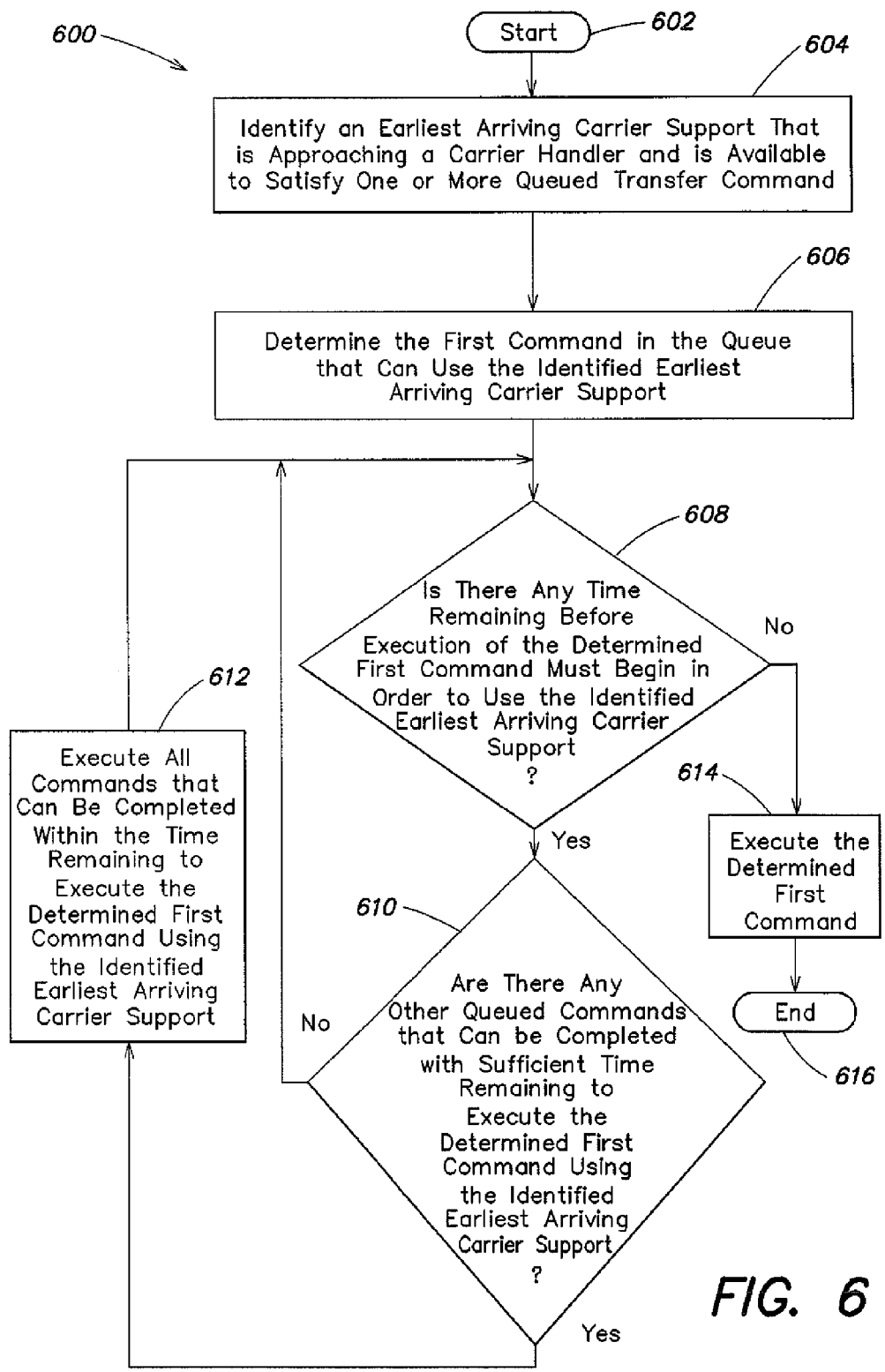
FIG. 6 is a flowchart depicting an example process for looking ahead into a command queue to find a command that can use the earliest arriving available carrier support according to some embodiments of the present invention.

Turning to FIG. 6, an example process 600 for looking ahead into a command queue to find a command that can use the earliest arriving available carrier support is depicted. The process 600 commences at step 602. In step 604, a carrier handler/substrate loading station determines or identifies the earliest arriving carrier support that is available to satisfy a queued transfer command. If the carrier handler has a transfer command queued that specifies transferring a carrier to the transport system, the carrier handler may look for the earliest arriving empty carrier support. Likewise, if the carrier handler has a transfer command queued that specifies transferring a carrier from the transport system, the carrier handler may look for the earliest arriving carrier support holding a carrier destined for the carrier handler.

In step 606, the first command in the queue that can use the identified carrier from Step 604 is determined. In step 608, the carrier handler determines if there is any time remaining to execute other commands before execution of the first command determined in step 606 must begin in order to use the earliest arriving carrier support identified in step 604. If there is time, then, in step 610, the carrier handler determines if any other commands can be completed before the carrier support identified in step 604 as the earliest arriving carrier support actually arrives. If there are commands that can be completed in time, then in step 612, those commands are executed and the process flow returns to the determination of step 608. If there are no commands that can be completed in time, process flow loops between steps 608 and 610 waiting for either (1) a new command to be added to the command queue that can be completed before the first command determined in step 606 must be started, or (2) time runs out and the first command determined in step 606 must be started in order to meet the carrier support identified in step 604. Returning to step 608, if the carrier handler determines that there is no time remaining to execute other commands before execution of the first command determined in step 606 must begin in order to use the earliest arriving carrier support identified in step 604, the first command is executed in step 614 and the process 600 ends in step 616.

Storing Transfer Times

Another, more general goal of the scheduler of a substrate loading station is to maximize the number of carriers that can be delivered to a port of an associated processing tool such that the tool is not "starved" (e.g., the tool does not have to suspend processing to wait for the delivery of additional substrates). The scheduler attempts to balance the requirement to supply the tool with new substrates with requirements for maximizing the number of carriers that can be delivered to the tool by the HOST/MCS (via the transport system and the carrier handler).

To optimize throughput, the scheduler may measure/determine and track estimated and actual times for each of the different types of movements the carrier handler is capable of performing or commands the carrier handler can execute. The scheduler's logic for selecting the next queued transfer to initiate, may use, for example, transfer times between storage locations and ports of processing tools, transfer times between storage locations and the transport system, the time it takes to move into position for a handoff with the transport system, etc. In some embodiments, the scheduler may not commit the carrier handler to performing a transfer associated with a handoff to/from the transport system, until the last possible moment required to move the carrier handler in position for such a handoff, based on the estimated/actual times stored in a time tracking database. More generally, the scheduler may not commit the carrier handler to executing a command associated with an external event (e.g., a handoff with the transport system or competition of substrate processing in a processing tool), until the last possible moment before the carrier handler has to start executing the command in conjunction with the external event. In other words, execution of commands that involve or interact with equipment external to, and not under the control of, the carrier handler/substrate loading station, may be delayed so that performance of the commands properly coincide with the actions of the external equipment (e.g., the arrival of a carrier support at the substrate loading station).

Figure 7:
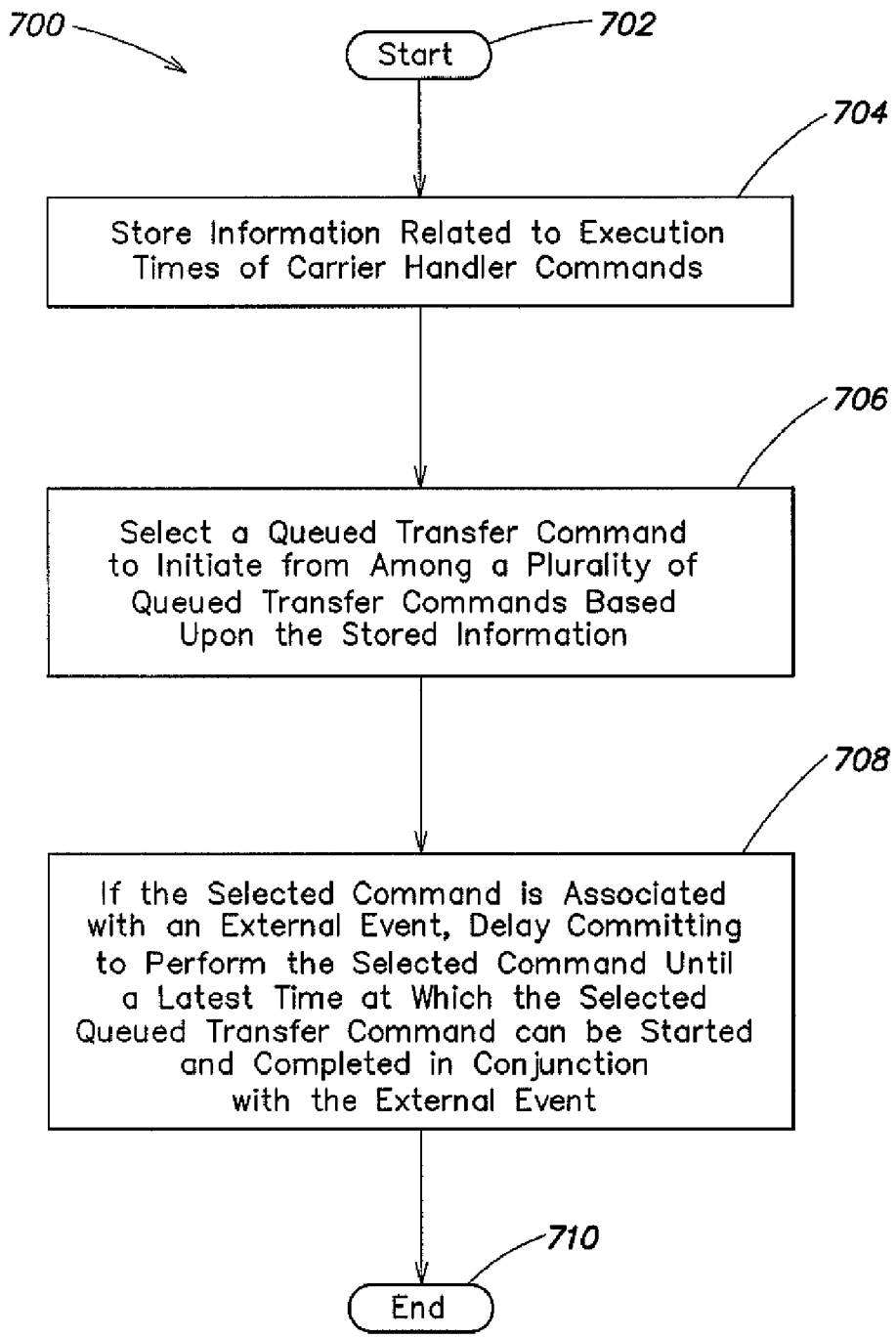
FIG. 7 is a flowchart depicting an example process for storing and using execution times to efficiently schedule commands according to some embodiments of the present invention.

Turning to FIG. 7, an example process 700 for storing and using execution times to efficiently schedule commands is depicted. The process 700 commences at step 702. In step 704, information related to execution times of various carrier handler commands are stored. The information may be a record of actual execution time measured during prior execution of the commands. In some embodiments, the information may be an estimate of execution times based upon a calculated value or an average of actual measured times. The information may include, for example, the amount of time it takes to transfer a carrier between various storage locations and various tool ports, between various storage locations and the transport system, and the amount of time it takes to move the carrier handler into position for a handoff with the transport system (e.g., time to prepare for a handoff to, or from, the transport system). The information may be stored in a storage device (e.g., memory, hard drive, etc.) as a database, a table, or in any number of other structures or formats.

In step 706, the carrier handler selects a transfer command for execution from among the commands in a command queue based upon the information stored in step 704. For example, a lower priority command that can be completed before a next carrier support arrives at the carrier handler may be selected for execution because such lower priority command represents the best/most efficient use of the carrier handler at the time (e.g., instead of merely waiting for the carrier support to arrive to execute a high priority command).

In step 708, if the selected command is associated with an external event, the carrier handler may delay committing to actually executing the selected command until the last possible moment in which to start wherein the selected command can still be completed in conjunction with the external event (e.g., before a selected carrier support arrives or another command must be started). By delaying committing to actually executing the selected command associated with an external event until the last moment, other commands may be scheduled before the selected command and throughput may thus be improved without any risk of negatively impacting throughput. In step 710, the process 700 ends.

Semi E84/E87 Enhancements

In accordance with the SEMI E84 standard, once a carrier is delivered to a loadport of a processing tool, the tool does not release control of the carrier until the all the substrates have been processed and returned back to the carrier. The port indicates that the carrier is ready for removal by updating the carrier's SEMI E87 state model and the carrier's SEMI E84 signals associated with the loadport. The change in the SEMI E87 state model indicates to the HOST/MCS that the transport system should be dispatched to remove the carrier from the port. As discussed above, this protocol may not be optimal for single or small lot size substrate carrier systems, because the tool may become starved and the protocol may result in too many transactions between the host and tool and between the HOST/MCS and the substrate loading station. In addition, operating the protocol with small lot sizes may result in loadport congestion (e.g., long wait times for loadports to become available to receive new carriers). In a single substrate carrier system, the tool will become starved if the tool is capable of processing more substrates than the number of available ports.

The present invention allows for substrates delivered in one carrier to be returned in a different carrier. To allow for the removal of a carrier as soon as the carrier is empty, the SEMI E84 state machine is changed in the present invention so that the state machine contains enough information to allow a substrate loading station to automatically act on this information. Further, the SEMI E84 state transition signals may be modified to contain information about the state of the carrier as being empty/done. The transitions may also implicitly contain information about the SEMI E87 state model (e.g., the status of the carrier may be: "ready to load", "transfer blocked", "ready to unload empty", and "ready to unload done"). According to the present invention, the carrier handler does not require a HOST/MCS command to remove carriers from a port when the carrier is in either a "ready to unload empty" or "ready to unload done" state.

Figure 8:
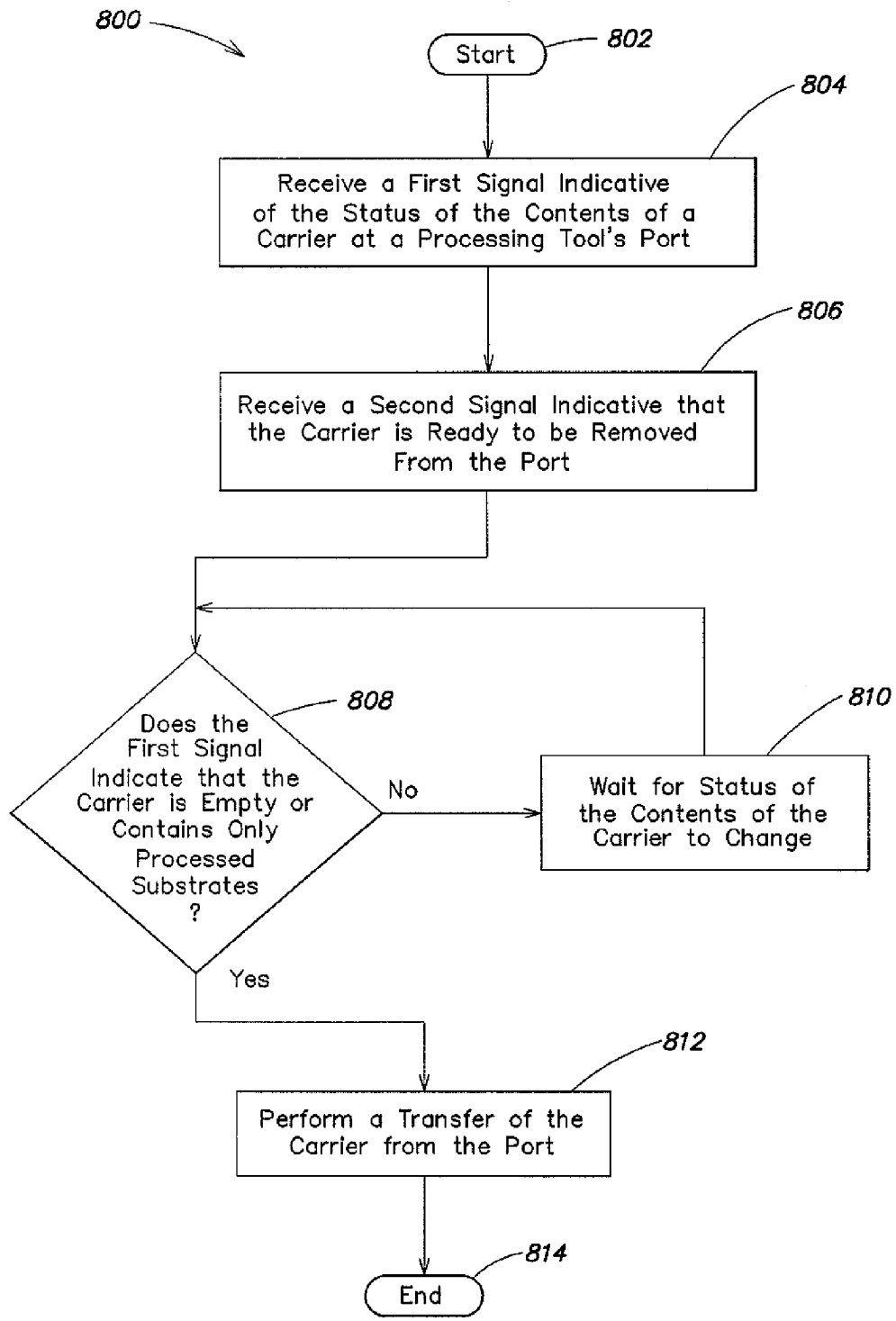
FIG. 8 is a flowchart depicting an example process for removal of empty substrate carriers from a processing tool according to some embodiments of the present invention.

Turning to FIG. 8, an example process 800 for removal of empty substrate carriers from a processing tool is depicted. The process 800 commences at step 802. In step 804, the carrier handler receives a status signal from the port of a processing tool that the carrier handler serves. The status signal may indicate that (a) a carrier at the port contains at least one unprocessed substrate or (b) that the carrier is empty or only contains processed substrates. In step 806, a second status signal is received by the carrier handler from the port. This second signal may indicate that the carrier is ready to be removed from the port. In step 808, the carrier handler determines if the carrier may be removed because the carrier is empty or only contains processed substrates based on the first signal. If not, in step 810, the carrier handler waits for a new first signal indicating that the contents of the carrier have changed. The process flows back to step 808 from step 810 once the contents of the carrier change. If in step 808 it is determined that the carrier is empty or only contains processed substrates, the carrier handler removes the carrier from the port in step 812. The process 800 ends in step 814.

Recovery from Failed Transfers

According to the present invention, the scheduler and carrier handler are able to recover from most failure conditions and make the substrate loading station usable, unless the hardware of the carrier handler fails in such a way that motion is not possible or motion of the carrier handler may result in damaging carriers or substrates.

If a transfer fails because the carrier handler cannot pick or place a carrier from an internal storage location, then the location may be marked as unusable but processing of other transfer requests may continue provided that the carrier handler can be moved safely out of the location associated with the failure without damaging the carrier. If, after a failure, the carrier is still on the end effector of the carrier handler, then the carrier may be placed at an alternate storage location, so that the carrier handler may be used to execute other transfer commands.

Figure 9:
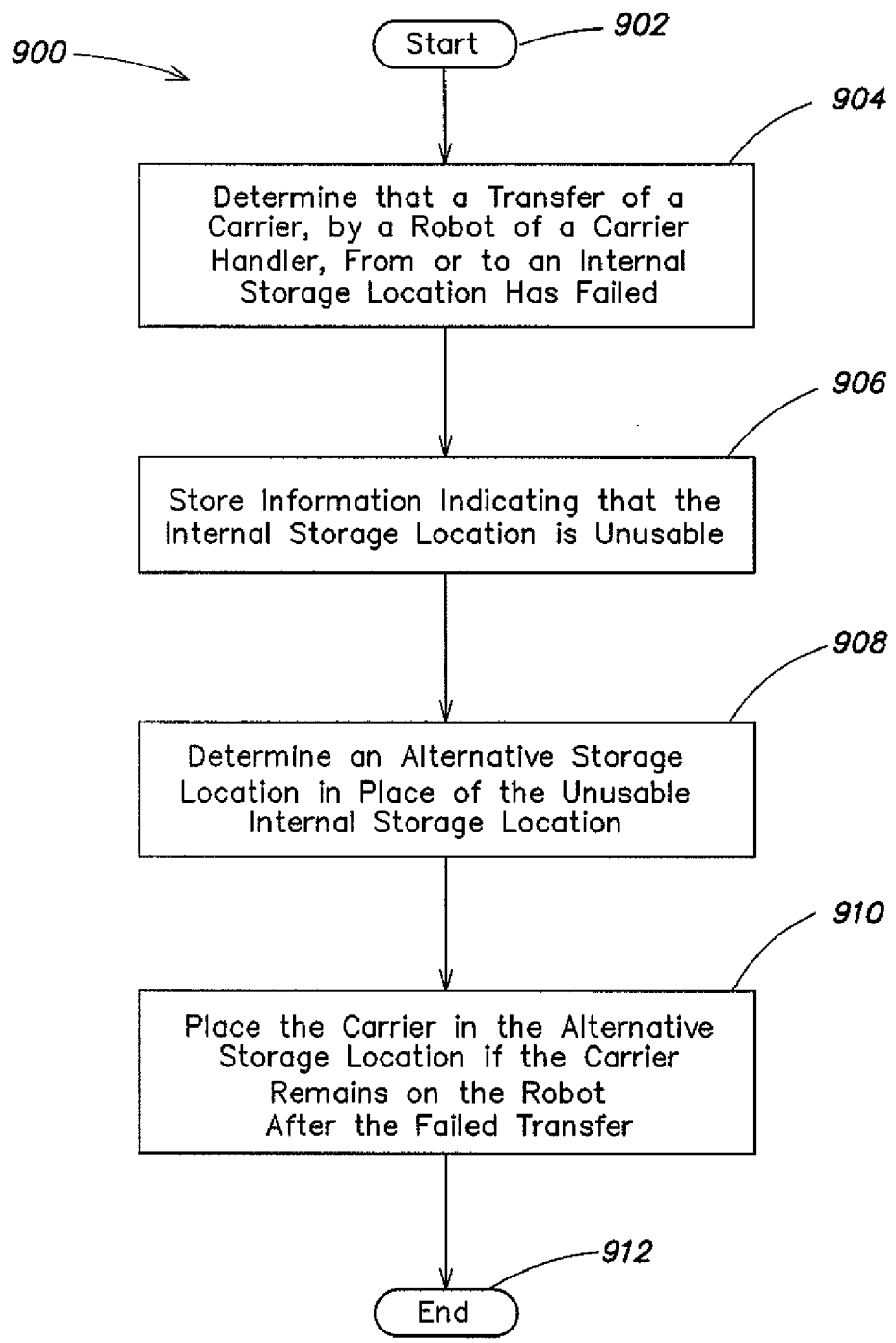
FIG. 9 is a flowchart depicting an example process for recovering from failed transfers according to some embodiments of the present invention.

Turning to FIG. 9, an example process 900 for recovering from failed transfers is depicted. The process 900 commences at step 902. In step 904, the carrier handler determines, or becomes aware, that a carrier transfer from, or to, an internal storage location of the carrier handler's substrate loading station has failed. In some embodiments for example, a robot of a carrier handler may not be able to place a carrier because the robot's motion is obstructed by an existing carrier in the target destination location. In step 906, information indicating that that internal storage location associated with the failure in step 904 is unusable is stored in a storage device (e.g., memory, hard drive, etc.) in a database, a table, or in any number of other structures or formats. In this way, future transfers to the unusable storage location can be avoided. In step 908, an alternative storage location in the substrate loading station or in another location may be determined. In step 910, if the carrier is still on the robot of the carrier handler (e.g., it was not dropped as a result of the failure detected in step 904), then the carrier may be placed in the alternative storage location determined in step 908. The process 900 ends in step 912.

Verification Using Sensors

If an internal software database error occurs within the controller of the carrier handler or, in some cases, the host/MCS, transfers may cause collision of two carriers that may result in damaging the substrates. In some embodiments, the end-effector of the robot/carrier handler may be equipped with sensors to allow verification of the validity of a handoff or transfer prior to the actual handoff so that damages to the carriers/substrates are avoided.

Figure 10:
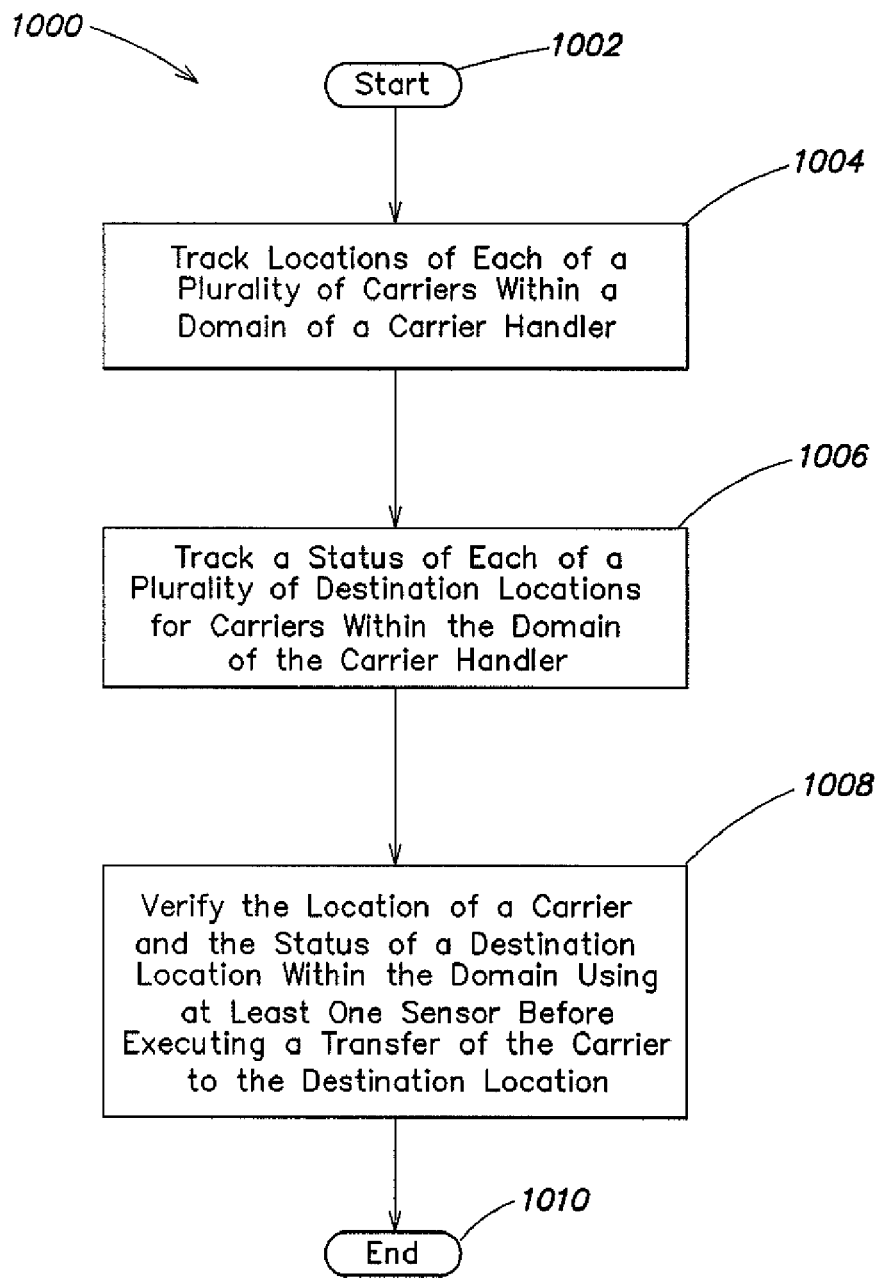
FIG. 10 is a flowchart depicting an example process for verifying that stored status data is accurate before executing transfers according to some embodiments of the present invention.

Turning to FIG. 10, an example process 1000 for verifying that stored status data is accurate before executing transfers is depicted. The process 1000 commences at step 1002. In step 1004, the locations of each carrier within the domain of a carrier handler are tracked and stored in a storage device (e.g., memory, hard drive, etc.) in a database, a table, or in any number of other structures or formats. The domain of a carrier handler may include all processing tool ports, internal and external storage locations, carrier support loading/unloading areas, end effectors, etc. under the control of the carrier handler. In step 1006, the status of each of the possible transfer destination locations (e.g., processing tool ports, internal and external storage locations, carrier support loading/unloading areas, end effectors, etc.) are tracked and stored in a storage device (e.g., memory, hard drive, etc.) in a database, a table, or in any number of other structures or formats. In step 1008, before a transfer to a target destination is executed, one or more physical sensors may used to verify that the correct location of the carrier to be transferred is known and that the transfer destination is available and ready to be accessed. The process 1000 ends at step 1010.

Handoff Calibration

Whenever a substrate loading station with a carrier handler is installed and added to a transport system, the handoffs to/from the transport system may need to be calibrated. Calibration of such handoffs preferably is done in a way that does not disrupt the continuous operation of the transport system (e.g., without stopping the conveyor). In some embodiments, carrier supports on the transport system may be reserved for special carriers that enable calibration (e.g., instrumented carriers that contain sensors, cameras, other measurement devices for use during calibration, a controller, and/or communication facilities such as wireless transmitters and receivers). Calibration of handoffs to/from the transport system may be negotiated between the TSC software and the loading station software (LSS) running on the carrier handler's controller, without the HOST/MCS having any knowledge of the calibration process. The carrier support locations containing "calibration carriers" may be known to both the LSS and the TSC software.

Figure 11:
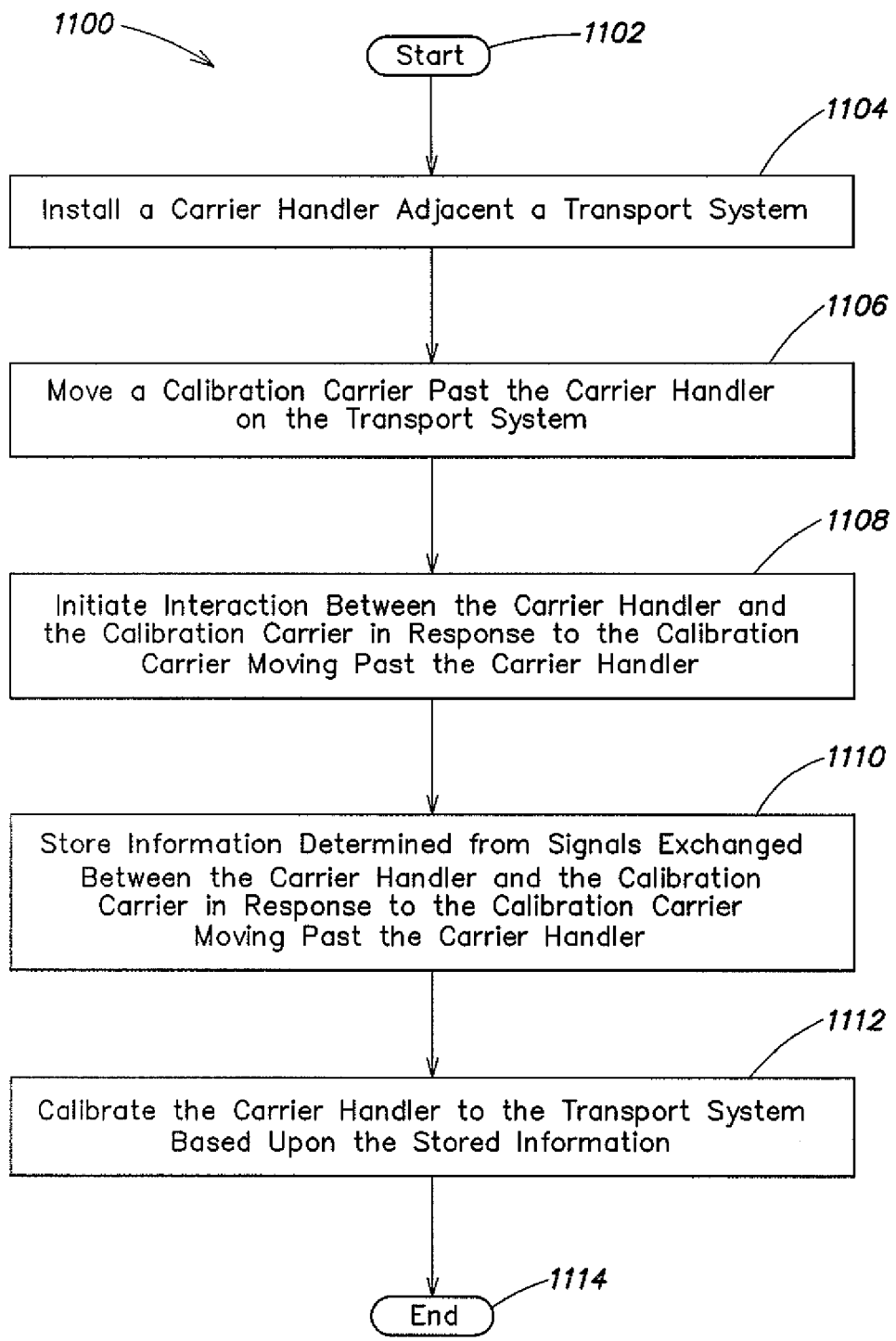
FIG. 11 is a flowchart depicting an example process for calibrating a handoff between a carrier handler and a transport system according to some embodiments of the present invention.

Turning to FIG. 11, an example process 1100 for calibrating a handoff between a carrier handler and a transport system without having to stop the transport system is depicted. The process 1100 commences at step 1102. In step 1104, a carrier handler/substrate loading station is installed adjacent a transport system. In step 1106, a calibration carrier is moved past the carrier handler on the transport system. In step 1108, interaction between the carrier handler and the calibration carrier is initiated in response to the calibration carrier moving past the carrier handler. In some embodiments, the calibration carrier may transmit position and velocity information wirelessly to the carrier handler equipped with a receiver. Alternatively or additionally, the carrier handler may transmit various signals to the calibration carrier indicating, for example, that the calibration carrier is approaching the carrier handler, the calibration carrier is within a loading zone of the carrier handler, etc. In step 1110, information obtained and/or determined from the calibration carrier being moved past the carrier handler is stored in a storage device (e.g., memory, hard drive, etc.) in a database, a table, or in any number of other structures or formats. In step 1112, the carrier handler is calibrated based upon the information stored in Step 1110. The process 1100 ends in step 1114.

Figure 12:
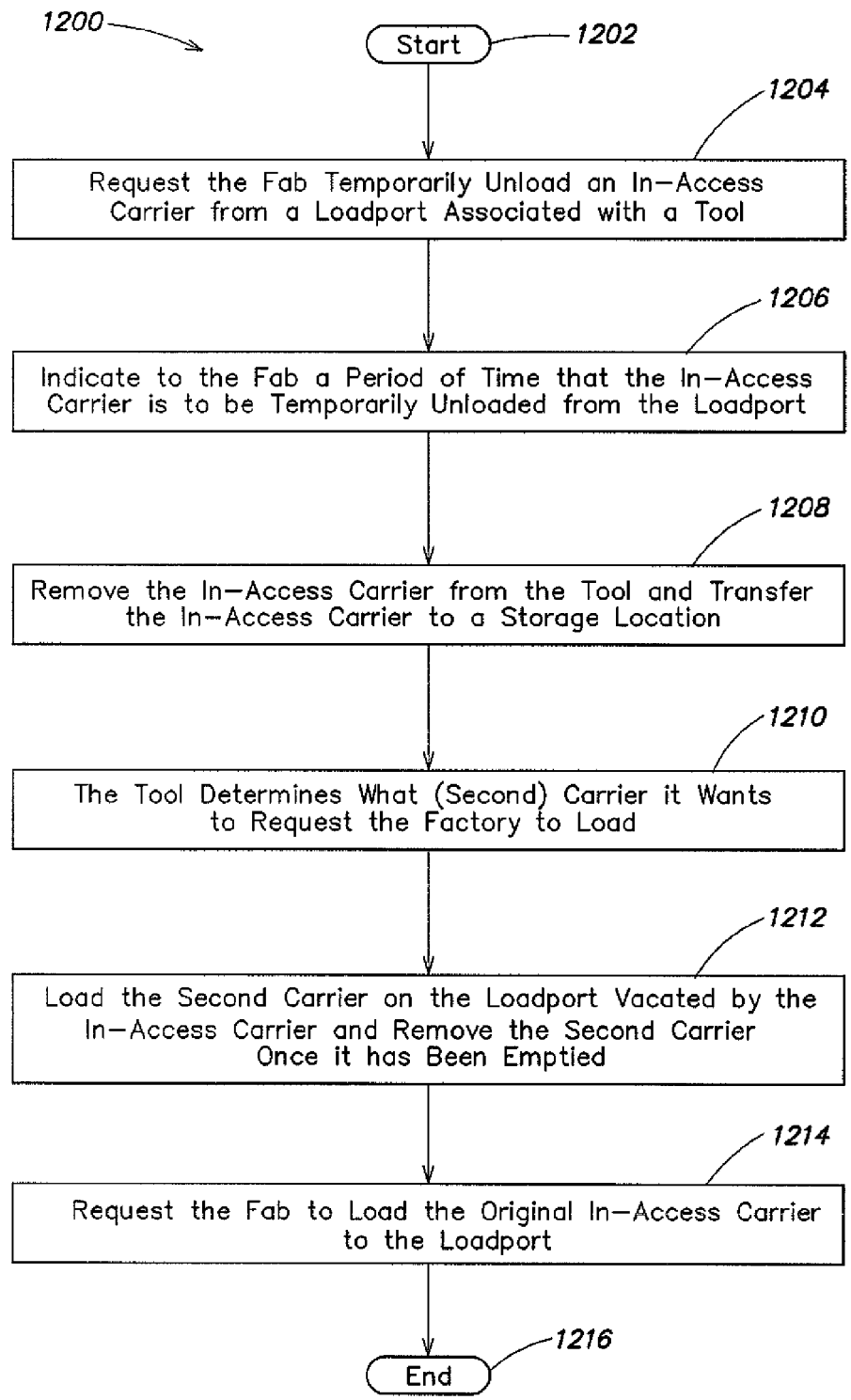
FIG. 12 is a flowchart depicting an example process of using the extended capabilities of the modified operating rules of the present invention.

Turning to FIG. 12, a flowchart depicting a method 1200 of using the extended capabilities of the modified operating rules of the present invention is provided. The method 1200 begins at step 1202. In step 1204, a tool requests that the Fab temporarily unloads an in-access carrier (e.g., a substrate carrier in the second state described above) from a loadport associated with a tool. This capability frees-up loadports and allows unprocessed substrates to be moved into the tool. Note that conventional operating rules do not permit such a request. Also note that conventional "batch" tools that allow the factory to indicate that input carriers need to be removed after being emptied (i.e., these tools follow the factory's instructions), treat such carriers as completed carriers, as opposed to in-access carriers, and when such completed carriers are removed, they are not removed temporarily. In other words, batch tools do not indicate to the factory that these carriers may need to be reloaded and also do not indicate what type of carriers to ask for in the batch tools "ready to load" requests.

In step 1206, the tool may optionally indicate to the Fab a period of time that the in-access carrier is to be temporarily unloaded from the loadport. This may allow the factory to make an informed decision as to how far from the tool the in-access carrier can be stored without causing any delays. In some situations, the factory may opt to either move the in-access carrier to an intermediate position or to start the process of returning the in-access carrier to the tool based on this information. In some cases, the factory may determine that no additional carriers will be available to bring to the tool in the period indicated to temporarily remove the in-access carrier and thus, the factory may decide not to remove the in-access carrier.

In step 1208, the Fab actually removes the in-access carrier from the tool if there will be a benefit in doing so. The in-access carrier is then transferred to a storage location, possibly determined based upon the period of time that the in-access carrier is to be temporarily unloaded from the loadport as mentioned above.

In step 1209, the tool may determine what carrier it wants to request the factory to load. This second carrier may be any carrier the factory wants to deliver, a specific carrier (e.g., which was previously unloaded temporarily), or a carrier that meets some specific criterion.

In step 1210, in response to the request made in step 1209, a second carrier (e.g., an unprocessed carrier, any carrier the factory wants to deliver, a carrier that meets some specific criteria, etc.) is delivered to the loadport that was vacated by the in-access carrier. Once the second carrier has been emptied (and possibly becomes a second in-access carrier), it may be removed (e.g., temporarily) and transferred to a storage location. In step 1214, the tool makes a request to the FAB to load (e.g., return) the specific original in-access carrier to the tool to receive the processed substrates from the tool. Thus the request may include a carrier identifier so that the specific carrier may be returned. In some embodiments, the request may alternatively specify a carrier based on certain criteria. For example, the criteria may specify an empty carrier, or a carrier adapted to hold copper substrates, or a carrier that can arrive within 20 seconds with an ability to hold at least two substrates, or etc. The method 1200 ends at step 1216.

As a specific example embodiment, the present invention may be implemented as an extension of the SEMI E87 standard (hereinafter "conventional E87"). The complete SEMI E87 standard is available from SEMI® (Semiconductor Equipment and Materials International), 3081 Zanker Road, San Jose, Calif. 95134.

Section 9.5 of conventional E87 provides a Load Port Transfer State Model that defines a host view of a carrier transfer and section 9.5.4 includes a Load Port Transfer Stage Transition Table that defines numerous transitions available under conventional E87. In accordance with the present invention, conventional E87 may be modified and/or extended by adding to the "Standard E87" Load Port Transfer state machine so as to allow a tool to request (the host) to load specific carriers and also indicate if carriers are being unloaded temporarily (e.g., because the carrier(s) will be needed in the near future). These modifications and/or extensions are fully backward compatible with conventional E87. The modified and/or extended states described herein are useful in improving the utilization of load ports when the lot size in carriers becomes small (compared with the tool capacity) and load ports become the bottleneck resource impacting tool productivity.

Figure 13:
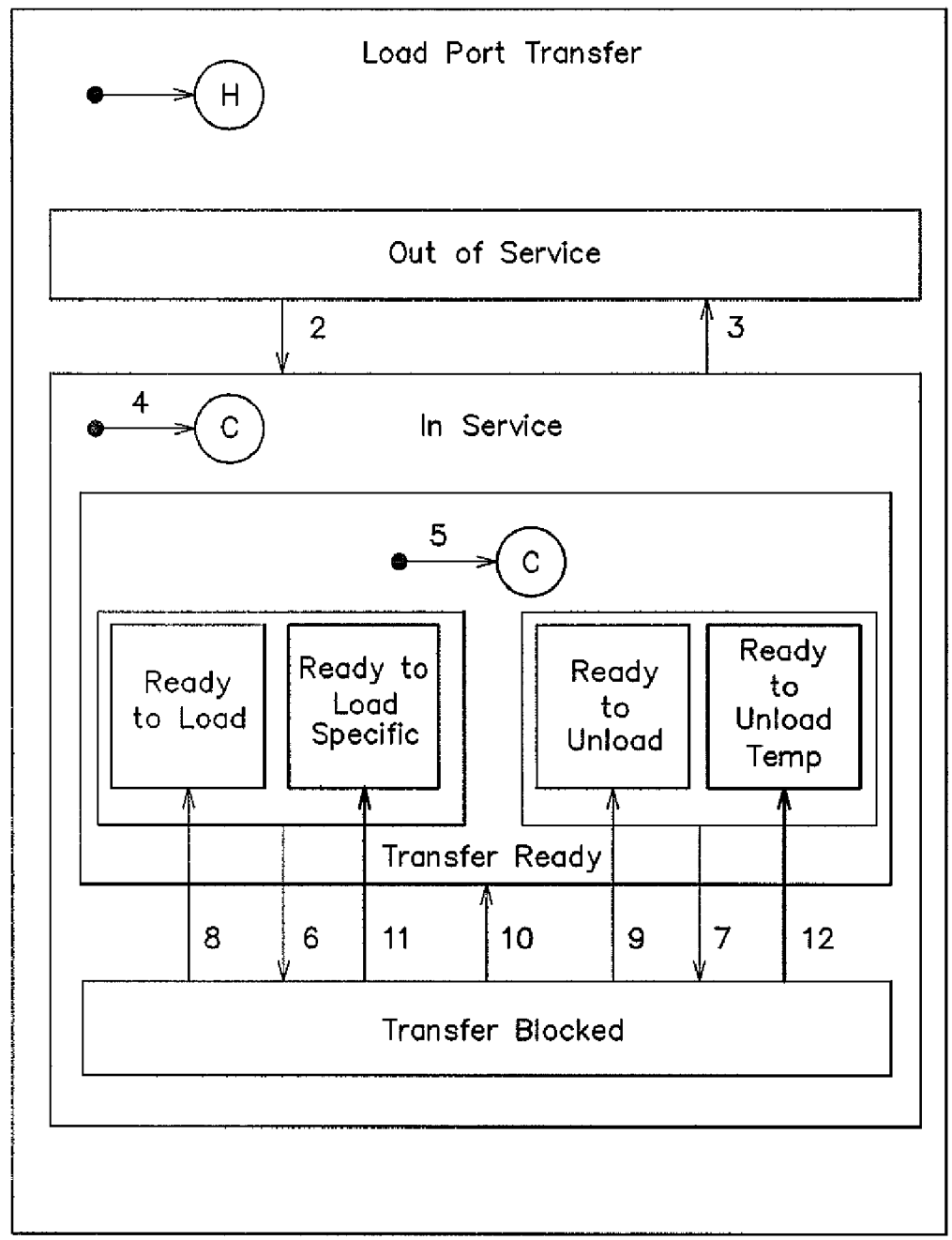
FIG. 13 is a block diagram of an E87 Load Port Transfer State Model having numerous modified and/or extended features provided in accordance with the present invention.

FIG. 13 is a block diagram of an E87 Load Port Transfer State Model having numerous modified and/or extended features provided in accordance with the present invention. Extended and/or modified features are shown in bold. For example, under conventional E87, with regard to Load Port Transfer State Transition number 5 (see E87 9.5.4 Load Port Transfer State Transition Table, Num 5.), when entering the TRANSFER READY state, the sub-state is READY TO UNLOAD (if a carrier is present); otherwise, the sub-state is READY TO LOAD.

In accordance with the present invention, transition number 5 may be modified and/or extended so that when entering the TRANSFER READY state, the sub-state may be READY TO UNLOAD or READY TO UNLOAD-TEMP (if a carrier is present); otherwise, the sub-state may be READY TO LOAD or READY TO LOAD-SPECIFIC. That is, the additional sub-states of READY TO UNLOAD-TEMP and READY TO LOAD-SPECIFIC may be provided.

If the state is READY TO LOAD-SPECIFIC, the data required to be available for this event report includes (1) PortID; (2) CarrierID (which identifies the carrier that the factory needs to load); and (3) CarrierProperty (if a tool wants any carrier that meets the specified property). The possible values may be, for example, 1: NONE and 2: EMPTY.

If the state is READY TO UNLOAD-TEMP, the data required to be available for this event report includes (1) PortID; (2) CarrierID; (3) PortTransferState; and (4) CarrierAccessingStatus (which will typically be IN-ACCESS).

Additional transitions also may be included in the E87 Load Port Transfer State Model. For example, the conventional E87 Load Port Transfer State Transition Table includes ten transitions. In at least one embodiment of the invention, an eleventh transition may be added from a previous state of TRANSFER BLOCKED to a new state of READY TO LOAD SPECIFIC. Similar (or the same) triggers used for transition 8 in the conventional E87 Load Port Transfer State Transition Table may be used. However, transition 11 is taken instead of transition 8 when a tool is requesting that a specific carrier (matching the specified CarrierID or some other property) be loaded by the HOST. A specific carrier can now be loaded onto the load port from an external entity. The data required to be available for this event report includes (1) PortID; (2) PortTransferState; (3) CarrierID (which identifies the carrier that the factory needs to load); and (4) CarrierProperty (if a tool wants any carrier that meets the specified property). The possible values may be, for example, 1:NONE, 2: EMPTY.

In some embodiments of the invention, a twelfth transition may be added from a previous state of TRANSFER BLOCKED to a new state of READY TO UNLOAD TEMP. Similar (or the same) triggers used for transition 9 in the conventional E87 Load Port Transfer State Transition Table may be used. However, transition 12 is taken instead of transition 9 when a tool wants to indicate to the HOST that the carrier is being temporarily unloaded, and will need to be reloaded in the near future. This acts as an indication to the factory to keep the carrier close to the tool. The carrier on the load port can now be unloaded from the load port to an external entity. The data required to be available for this event report includes (1) PortID; (2) CarrierID; (3) PortTransferState; and (4) CarrierAccessingStatus (this will typically be IN-ACCESS).

Section 10.2.5 of conventional E87 describes Carrier Object Destruction and Section 10.3 of conventional E87 describes carrier attribute definitions relevant to host and equipment for administering reports and history for carrier objects. In accordance with some embodiments of the invention, modified and/or extended (additional) Carrier Attribute Definitions may be provided (e.g., to Table 6 of section 10.3.4 of E87). For example, CarrierProperty may be included as a property that identifies the type of carrier that a tool is requesting to be loaded on a load port. This is required only if the tool implements the extensions of the present invention. Access for CarrierProperty may be, for example, read only (RO), and the attribute is not required. The form of CarrierProperty may be, for example, text of 1 to 80 characters, although other form types and/or sizes may be used. By default, all FABs may understand "EMPTY" to imply an empty carrier. The text may be free form and meaningful to the FAB. For example, the text "EMPTY-EOL" may be used as the CarrierProperty to signify an Empty carrier that can be used in the EOL area of the FAB.

Figure 14:
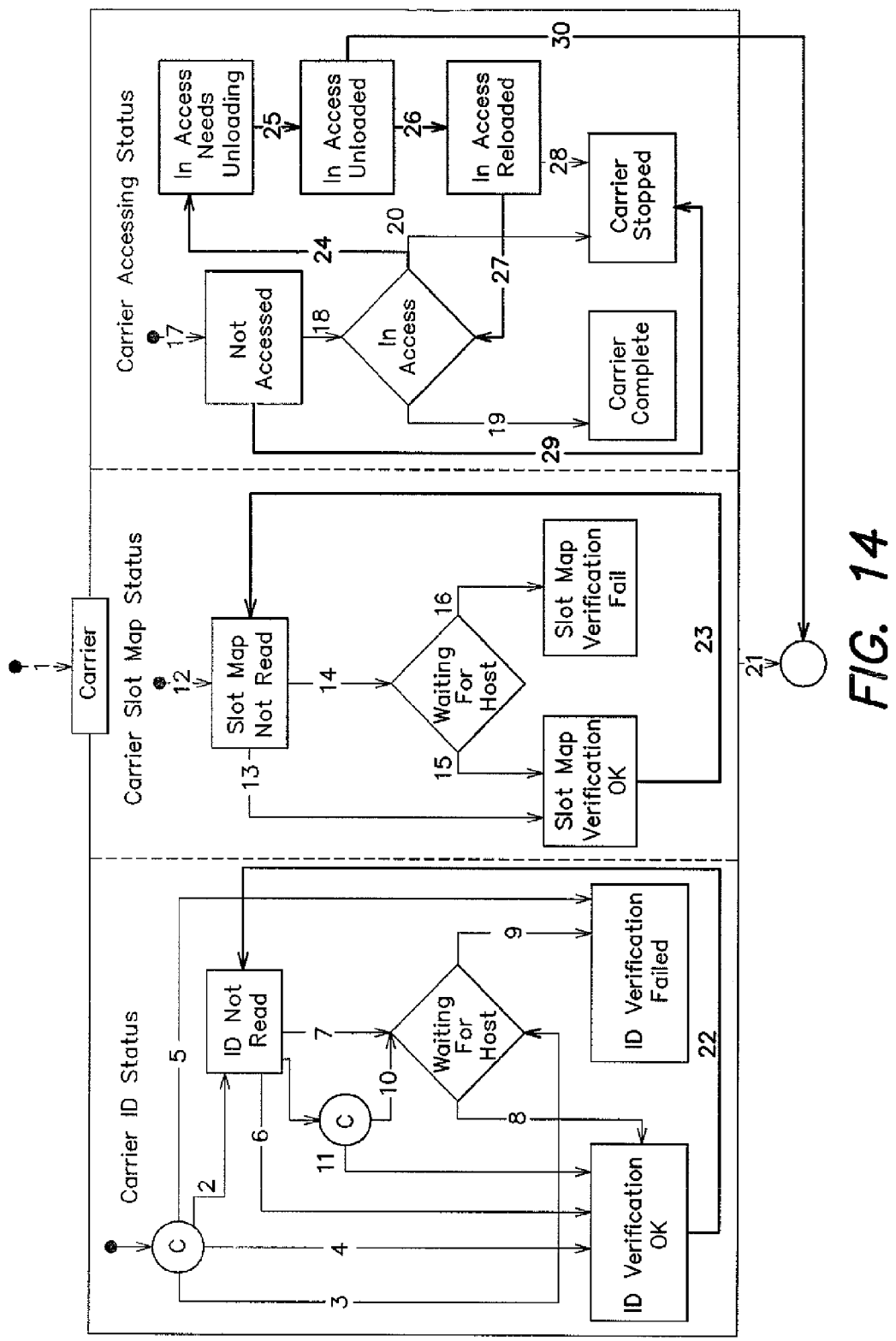
FIG. 14 depicts a novel modified and/or extended example Carrier State Model that may be used to allow a tool to reach its peak throughput with fewer loadports and smaller lot sizes.

Section 10.7 of conventional E87 describes the Carrier State Model used to define a host's view of a substrate carrier. In accordance with the present invention, FIG. 14 shows a novel modified and/or extended carrier state model that may be used to allow a tool to reach its peak throughput with fewer loadports and smaller lot sizes (e.g., less than the 25 wafer lot size conventionally used). This model may be similar (or identical) to the model specified in SEMI E87-0703 except for the modified and/or extended states and/or transitions provided in accordance with the present invention. Exemplary modified and/or extended states and transitions are shown in bold in FIG. 14 (e.g., transitions 21-30).

Section 10.7.4 of conventional E87 provides a Carrier State Transition Table that identifies triggers and expected behavior of an instantiated carrier object. In accordance with the present invention, modified and/or extended triggers and expected behaviors may be provided as identified in FIGS. 15A-D which illustrate an extension of the carrier state transition definitions of conventional E87. (FIGS. 15A-D may also be referred to as "Table 7 Extension of Carrier State Transition Definition of E87"). Specifically, definitions 22-30 in Table 7 Extension of Carrier State Transition Definition of E87 (FIGS. 15A-D) provide extended and/or modified triggers and expected behaviors for an instantiated carrier object. Note that the number entries in FIGS. 15A-D correspond to the reference numerals provided on the arrows of FIG. 14.

In at least one embodiment of the invention, entry 21 in Table 7 Carrier State Transition Definition of E87 Section 10.7.4.1 may be configured so as to not apply to IN ACCESS NEEDS LOADING (see entry 25 of FIG. 15B of Table 7 Extension of Carrier State Transition Definition of E87). Further, when a request to LOAD is initiated for a carrier that is in an IN ACCESS UNLOADED state, but the FAB does not have this carrier, or the FAB delivers this carrier but the slot map verification fails, there may be a need to re-associate the substrates that were originally from this carrier to a different carrier so they can be unloaded automatically.

Section 19 (Table 37) of conventional E87 defines variable data requirements for CMS equipment. In addition to the variable data definitions provided in Table 37 of section 19 of conventional E87, a CarrierProperty variable may be provided in accordance with the present invention that identifies the type of carrier that a tool is requesting to be loaded on a load port. This is required only if the tool implements the extensions specified herein. In at least one embodiment, this variable may be text from 1 to 80 characters, although other types and/or lengths may be used. By default, all FABs may understand "EMPTY" to imply an empty carrier. The text may be free form and meaningful to the FAB. For example, the test "EMPTY-EOL" may be used as the CarrierProperty to signify an Empty carrier that can be used in the EOL area of the FAB. Other modifications and/or extensions to conventional E87 may be provided.

The foregoing description discloses only particular embodiments of the invention; modifications of the above disclosed methods and apparatus which fall within the scope of the invention will be readily apparent to those of ordinary skill in the art. For instance, it will be understood that the invention also may be employed with any type of substrates such as a silicon substrate, a glass plate, a mask, a reticule, a wafer, etc., whether patterned or unpatterned; and/or with apparatus for transporting and/or processing such substrates. Accordingly, while the present invention has been disclosed in connection with specific embodiments thereof, it should be understood that other embodiments may fall within the spirit and scope of the invention, as defined by the following claims.

The invention claimed is:

1. A method of transferring substrates within a process tool, comprising:
    providing a substrate loading station;
    loading a first carrier containing unprocessed substrates to a first loadport of the substrate loading station associated with the process tool;
    removing all the unprocessed substrates from the first carrier to provide an empty first carrier;
    temporarily unloading the empty first carrier from the first load port and transferring the empty first carrier to a storage location of the substrate loading station;
    loading a second carrier containing unprocessed substrates on the first loadport vacated by the empty first carrier; and
    loading an empty carrier to a second loadport of the substrate loading station associated with the process tool, where the empty carrier is one of the empty first carrier and a different empty carrier than the empty first carrier.

2. The method of claim 1 wherein the first carrier is a small lot size carrier.

3. The method of claim 1 wherein the step of temporarily unloading takes place as soon as all the unprocessed substrates have been removed from the first carrier.

4. The method of claim 1 wherein the step of loading an empty carrier occurs when the unprocessed substrates originally removed are processed by the tool.

5. The method of claim 1 wherein the step of loading an empty carrier comprises loading a specific carrier.

6. The method of claim 1 further comprising a step of reloading the empty first carrier pending a request from the process tool.

7. The method of claim 1 wherein the step of loading an empty carrier comprises loading a substrate carrier that is both empty and adapted to only accept certain types of substrates.

8. A method of transferring substrates within a process tool, comprising:
- loading a first carrier containing unprocessed substrates to a first loadport associated with the process tool;
- removing all the unprocessed substrates from the first carrier to provide an empty first carrier;
- temporarily unloading the first carrier from the first load port and transferring the first carrier to a storage location;
- loading a second carrier containing unprocessed substrates on the first loadport vacated by the first carrier;
- loading an empty carrier to a second loadport associated with the process tool; and
- determining a proximity of the storage location based upon an estimate of when the empty first carrier will be needed for loading to a loadport of the process tool.

9. A method of transferring substrates within a process tool, comprising:
- loading a first carrier containing unprocessed substrates to a first loadport associated with the process tool;
- removing all the unprocessed substrates from the first carrier to provide an empty first carrier;
- temporarily unloading the first carrier from the first load port and transferring the first carrier to a storage location;
- loading a second carrier containing unprocessed substrates on the first loadport vacated by the first carrier;
- loading an empty carrier to a second loadport associated with the process tool; and
- estimating a reload time to load the empty carrier to the second loadport.

10. A method of transferring substrates within a process tool, comprising:
- loading a first carrier containing unprocessed substrates to a first loadport associated with the process tool;
- removing all the unprocessed substrates from the first carrier to provide an empty first carrier;
- temporarily unloading the first carrier from the first load port and transferring the first carrier to a storage location;
- loading a second carrier containing unprocessed substrates on the first loadport vacated by the first carrier;
- loading an empty carrier to a second loadport associated with the process tool; and
- pre-positioning the empty carrier at an intermediate location closer to the second loadport prior to an actual reload request.

11. A method of transferring substrates within a process tool, comprising:
- providing a substrate loading station;
- loading a first carrier containing unprocessed substrates to a first loadport of the substrate loading station associated with the process tool;
- removing unprocessed substrates from the first carrier, to provide an empty first carrier;
- temporarily unloading the empty first carrier from the first loadport and transferring the empty first carrier to a storage location of the substrate loading station; and thereafter
- loading the empty first carrier to a loadport of the substrate loading station associated with the process tool other than the first loadport.

12. The method of claim 11 wherein the first carrier is a small lot size carrier.

13. The method of claim 11 wherein the step of temporarily unloading takes place as soon as the unprocessed substrates have been removed from the first carrier.

14. The method of claim 11 further comprising a step of reloading the empty first carrier pending a request from the process tool.

15. A method of transferring substrates within a process tool, comprising:
- loading a first carrier containing unprocessed substrates to a first loadport associated with the process tool;
- removing unprocessed substrates from the first carrier, making the first carrier empty;
- temporarily unloading the first carrier from the first loadport and transferring the first carrier to a storage location; and thereafter
- loading the empty first carrier to a loadport associated with the process tool other than the first loadport; and
- determining a proximity of the storage location based upon an estimate of when the empty first carrier will be needed for loading to a loadport of the process tool.

16. The method of claim 15 wherein the first carrier is a small lot size carrier.

17. The method of claim 15 wherein after the step of temporarily unloading the first carrier from the first loadport, the process tool provides an estimate indicating when the first carrier will be needed again.

18. The method of claim 15 further comprising estimating a reload time to load the empty first carrier to the loadport other than the first loadport.

19. The method of claim 15 further comprising pre-positioning the empty first carrier at an intermediate location closer to the loadport other than the first loadport prior to an actual reload request.

* * * * *